United States Patent
Bursill et al.

(10) Patent No.: US 11,250,624 B2
(45) Date of Patent: Feb. 15, 2022

(54) METHODS OF DISPLAYING AN AUGMENTED REALITY MODEL ON AN AUGMENTED REALITY DEVICE

(71) Applicant: Trimble Inc., Sunnyvale, CA (US)

(72) Inventors: Adam Bursill, Christchurch (NZ); Darrin Hurd, Christchurch (NZ); Mark Nichols, Christchurch (NZ)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 16/857,996

(22) Filed: Apr. 24, 2020

(65) Prior Publication Data

US 2021/0335035 A1 Oct. 28, 2021

(51) Int. Cl.
| | |
|---|---|
| *G06T 15/00* | (2011.01) |
| *G06T 17/05* | (2011.01) |
| *G06T 19/20* | (2011.01) |
| *G06T 19/00* | (2011.01) |
| *G06T 7/73* | (2017.01) |
| *H04W 4/02* | (2018.01) |
| *H04W 4/029* | (2018.01) |
| *G01S 19/47* | (2010.01) |

(52) U.S. Cl.
CPC .............. *G06T 17/05* (2013.01); *G01S 19/47* (2013.01); *G06T 7/74* (2017.01); *G06T 19/006* (2013.01); *G06T 19/20* (2013.01); *H04W 4/026* (2013.01); *H04W 4/029* (2018.02); *G06T 2219/2004* (2013.01); *G06T 2219/2016* (2013.01)

(58) Field of Classification Search
CPC ......... G06T 19/00; G06T 17/20; G06T 17/00; G06T 15/10; G06T 15/00

USPC ......................................................... 345/419
See application file for complete search history.

(56) References Cited

U.S. PATENT DOCUMENTS

| | | | |
|---|---|---|---|
| 6,064,335 A | 5/2000 | Eschenbach | |
| 6,124,825 A | 9/2000 | Eschenbach | |
| 7,245,999 B2 | 7/2007 | Dietsch et al. | |
| 7,681,192 B2 | 3/2010 | Dietsch et al. | |
| 8,478,492 B2 | 7/2013 | Taylor et al. | |
| 10,432,888 B2 | 10/2019 | Hurd et al. | |
| 2004/0051680 A1 | 3/2004 | Azuma et al. | |
| 2009/0293012 A1 | 11/2009 | Alter et al. | |
| 2012/0293325 A1 | 11/2012 | Lahcanski et al. | |
| 2012/0293394 A1 | 11/2012 | Lahcanski | |
| 2014/0247279 A1 | 9/2014 | Nicholas et al. | |
| 2016/0284125 A1 | 9/2016 | Bostick et al. | |
| 2018/0039821 A1 | 2/2018 | Gren et al. | |

(Continued)

FOREIGN PATENT DOCUMENTS

| | | |
|---|---|---|
| EP | 3 470 961 A1 | 4/2019 |
| GB | 2 519 744 A | 5/2015 |

OTHER PUBLICATIONS

Extended European Search Report for Application No. 18198879.1-1206 dated Mar. 1, 2019, 8 pages.

(Continued)

*Primary Examiner* — Gordon G Liu
(74) *Attorney, Agent, or Firm* — Kilpatrick Townsend & Stockton LLP

(57) ABSTRACT

Methods for displaying an augmented reality (AR) model on an AR device are disclosed. Alignment between a geospatial reference frame and an AR reference frame is monitored and adjusted to improve placement of the AR model displayed on the AR device.

20 Claims, 20 Drawing Sheets

(56) References Cited

U.S. PATENT DOCUMENTS

2019/0096131 A1* 3/2019 Crews .................. G06F 1/163
2019/0110016 A1* 4/2019 Hurd ..................... G01S 19/45

OTHER PUBLICATIONS

U.S. Appl. No. 15/729,044 Notice of Allowance dated May 6, 2019, 11 pages.
Extended European Search Report for Application No. 21169703.2-1206, dated Aug. 30, 2021, 7 pages.

\* cited by examiner

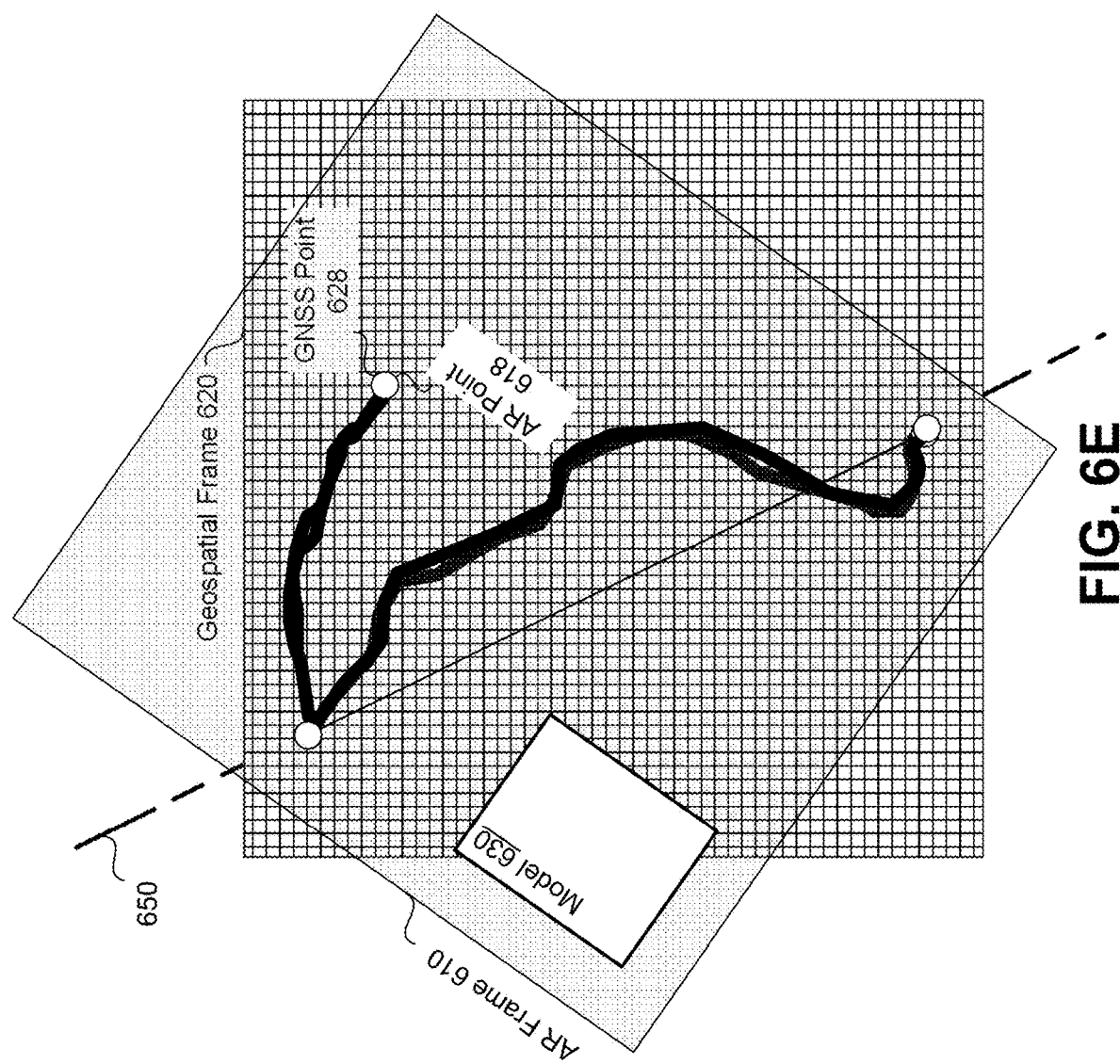

METHODS OF DISPLAYING AN AUGMENTED REALITY MODEL ON AN AUGMENTED REALITY DEVICE

BACKGROUND

The recent growth of virtual reality (VR) and augmented reality (AR) technologies has been remarkable. In most implementations, VR and AR systems include devices that allow digitally reproduced images to be presented to a user in a manner wherein they seem to be, or may be perceived as, real. A VR scenario typically involves presentation of digital or virtual image information without transparency to other actual real-world visual input, whereas an AR scenario typically involves presentation of digital or virtual image information as an augmentation to visualization of the actual world around the user.

Global navigation satellite systems (GNSSs) use wireless signals that are transmitted from medium Earth orbit (MEO) satellites to GNSS receivers to determine position and velocity information for the GNSS receivers. Examples of currently operational GNSSs include the United States' Global Positioning System (GPS), the Russian Global Navigation Satellite System (GLONASS), the Chinese BeiDou Satellite Navigation System, and the European Union's (EU) Galileo. Today, GNSS receivers are used in a wide range of applications, including navigation (e.g., for automobiles, planes, boats, persons, animals, freight, military precision-guided munitions, etc.), surveying, mapping, and time referencing.

Despite the progress of VR and AR technologies, there is a need in the art for improved methods for displaying AR models on AR devices.

SUMMARY

Embodiments of the present disclosure improve methods for displaying AR models on AR devices by improving alignment between geospatial and AR reference frames. Some embodiments, as an example, correct tilt of an AR model if it is misaligned with a geospatial reference frame, while other embodiments correct for jumps of the AR model caused by errors in visual odometry. In yet other embodiments, positioning of the AR model is improved during periods when visual tracking is difficult or not available. These embodiments may be used individually or together to improve positioning of the AR model on a display of an AR device.

In accordance with an embodiment, for example, a method for displaying an AR model on an AR device includes: receiving, from a GNSS receiver, GNSS position data based on wireless signals received from GNSS satellites; receiving, from one or more cameras, image information; determining, from the image information, camera position and orientation (POS) data; aligning a GNSS vector in a geospatial reference frame with an AR vector in an AR reference frame, the GNSS vector determined using the GNSS position data, and the AR vector determined using the camera POS data; determining, based on the GNSS position data, a GNSS point within the geospatial reference frame; determining, based on the camera POS data, an AR point within the AR reference frame; determining, based on the GNSS point and the AR point, that the geospatial reference frame and the AR reference frame are misaligned; and rotating at least one of the geospatial reference frame or the AR reference frame such that the GNSS point is aligned with the AR point, while maintaining alignment between the GNSS vector and the AR vector, so that coordinates in the AR model approximately align with corresponding coordinates in the geospatial reference frame.

In an embodiment, the rotation of at least one of the geospatial reference frame or the AR reference frame is about a horizontal axis.

In another embodiment, determining that the geospatial reference frame and the AR reference frame are misaligned includes determining that the geospatial reference frame and the AR reference frame are misaligned by more than a predetermined amount.

In another embodiment, determining that the geospatial reference frame and the AR reference frame are misaligned includes determining that the geospatial reference frame and the AR reference frame are misaligned vertically.

In another embodiment, the GNSS receiver is integrated with the AR device, and/or the one or more cameras are integrated with the AR device.

In another embodiment, aligning the GNSS vector in the geospatial reference frame with the AR vector in the AR reference frame comprises: determining, based on the GNSS position data, a first GNSS point within the geospatial reference frame at a first GNSS time within a first time range and a second GNSS point within the geospatial reference frame at a second GNSS time within a second time range, the first GNSS point and the second GNSS point forming the GNSS vector; determining, based on the camera POS data, a first AR point within the AR reference frame at a first AR time within the first time range and a second AR point within the AR reference frame at the second AR time within the second time range, the first AR point and the second AR point forming the AR vector; shifting at least one of the geospatial reference frame or the AR reference frame such that the second GNSS point is aligned with the second AR point; thereafter calculating an angle formed by the GNSS vector and the AR vector; and rotating at least one of the geospatial reference frame or the AR reference frame to the other of the geospatial reference frame or the AR reference frame based on the angle.

In yet another embodiment, the AR reference frame is rotated to align with the geospatial reference frame such that the GNSS point is aligned with the AR point.

In accordance with another embodiment, a method for displaying an AR model on an AR device includes: receiving, from a GNSS receiver, GNSS position data associated with a geospatial reference frame, the GNSS position data based on wireless signals received from GNSS satellites; receiving, from one or more cameras, image information; determining, from the image information, camera POS data associated with an AR reference frame; detecting a first change in position or rotation of the AR model relative to the geospatial reference frame; detecting a second change in position or rotation of the AR device relative to the AR reference frame; determining that the first change is different from the second change in at least one of shift or rotation; and performing at least one of shifting the AR reference frame or rotating the AR reference frame relative to the geospatial reference frame by an amount approximately equal in magnitude but opposite in direction to the first change, so that coordinates in the AR model approximately align with corresponding coordinates in the geospatial reference frame.

In an embodiment, the first change occurs between a first frame of the one or more cameras and a second frame of the one or more cameras.

In another embodiment, the first change is a change in position or rotation that is more than the second change by greater than a predetermined amount.

In another embodiment, shifting or rotating the AR reference frame relative to the geospatial reference frame shifts or rotates the AR model relative to the geospatial reference frame.

In yet another embodiment, the second change is determined using inertial sensors configured to determine movement of the AR device relative to the AR reference frame.

In accordance with yet another embodiment, a method for displaying an AR model on an AR device includes: receiving, from a GNSS receiver, GNSS position data associated with a geospatial reference frame, the GNSS position data based on wireless signals received from GNSS satellites; receiving, from one or more cameras, image information; determining, from the image information, camera POS data associated with an AR reference frame; receiving, from the GNSS receiver and one or more inertial sensors, sensor position and orientation data associated with a sensor reference frame; tracking, during a first period of time and using the camera POS data, a position and orientation of the AR device, wherein the AR model is arranged within the AR reference frame during the first period of time; thereafter tracking, during a second period of time and using the sensor position and orientation data, the position and orientation of the AR device, wherein the AR model is arranged within the sensor reference frame during the second period of time; and thereafter tracking, during a third period of time and using the camera POS data, the position and orientation of the AR device, wherein the AR model is arranged within the AR reference frame during the third period of time.

In an embodiment, the position and orientation of the AR device is tracked during the first period of time and the third period of time using visual odometry.

In another embodiment, the sensor position and orientation data is provided by the GNSS receiver and one or more inertial sensors coupled to the AR device.

In another embodiment, insufficient image contrast exists to track the position and orientation of the AR device during the second period of time.

In another embodiment, during the second period of time, the geospatial reference frame is more closely aligned with the sensor reference frame than the AR reference frame.

In yet another embodiment, the GNSS receiver is integrated with the AR device, and/or the one or more cameras are integrated with the AR device.

Embodiments of the present disclosure may include a non-transitory computer readable storage media comprising instructions to cause one or more processors within an AR device to perform operations comprising the described methods. Embodiments of the present disclosure may also include an AR device including a GNSS receiver, an antenna, a radio frequency (RF) front end, a receiver processor, one or more cameras, a display, and a processor configured to perform the described methods.

BRIEF DESCRIPTION OF THE DRAWINGS

The accompanying drawings, which are included to provide a further understanding of the embodiments described herein, are incorporated in and constitute a part of this specification, and together with the detailed description, serve to explain the principles of the various embodiments. No attempt is made to show structural details in more detail than may be necessary for a fundamental understanding of the embodiments and various ways in which they may be practiced.

FIGS. 6A-6G illustrate methods for displaying an AR model on an AR device, according to some embodiment of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Embodiments of the present disclosure provide improved methods for displaying AR models on AR devices. Some embodiments improve positioning of the AR models so they are displayed more accurately. For example, one embodiment corrects tilt of an AR model if it is misaligned with a geospatial reference frame. An AR reference frame may be aligned with the geospatial reference frame along multiple axes but tilted (or misaligned) along one axis. The tilt can be corrected while maintaining alignment between the other axes.

Another embodiment corrects for jumps or sudden movements of the AR model that are not caused by corresponding movements of the AR device. A user sees these jumps as a sudden movement of the AR model relative to actual features in the environment. These sudden movements are typically caused by errors in the visual odometry process, where objects or features are mis-identified and the AR reference frame is incorrectly adjusted. The jumps can be detected and corrected or suppressed.

Another embodiment improves positioning of the AR model during periods when visual tracking is difficult or not available. This can occur when there are not enough features or there is not enough contrast between image features for tracking. GNSS positions and inertial sensors can be used to provide motion tracking when visual tracking is lost. Each of these embodiments may be used individually or together to improve positioning of the AR model on an AR device.

Figure 1:
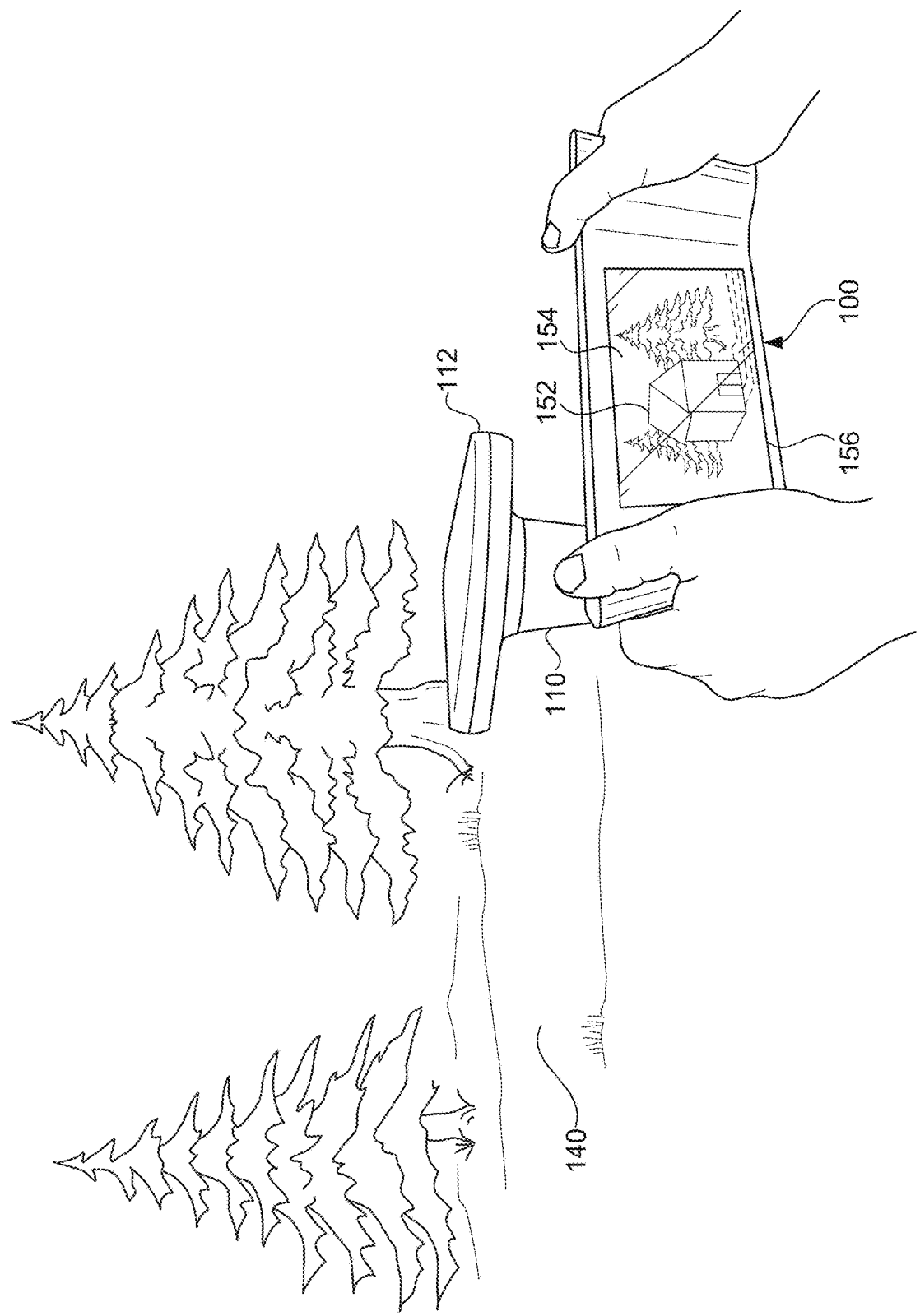
FIG. 1 illustrates an AR device in use at a potential construction site, according to an embodiment of the present disclosure.

FIG. 1 illustrates an AR device 100 in use at a potential construction site 140, according to an embodiment of the present disclosure. AR device 100 may include a display 156 for displaying an AR model 152 that is superimposed onto a camera image 154 (collectively referred to as a superimposed image 182), one or more cameras 160 (not shown in FIG. 1), and one or more inertial sensors 162 (not shown in FIG. 1). In some embodiments, AR device 100 is coupled to, integrated with, and/or in data communication with a GNSS receiver 110. GNSS receiver 110 may include an antenna 112 and may be configured to provide high-accuracy position data of GNSS receiver 110. Where the spatial relationship between GNSS receiver 110 and a camera of AR device 100 is known, the position data generated by GNSS receiver 110 may be used to determine position data for the camera, allowing proper placement of AR model 152 onto camera image 154. Although FIG. 1 depicts an outdoor setting, use of AR device 100 in various indoor settings is also possible.

Figure 2:
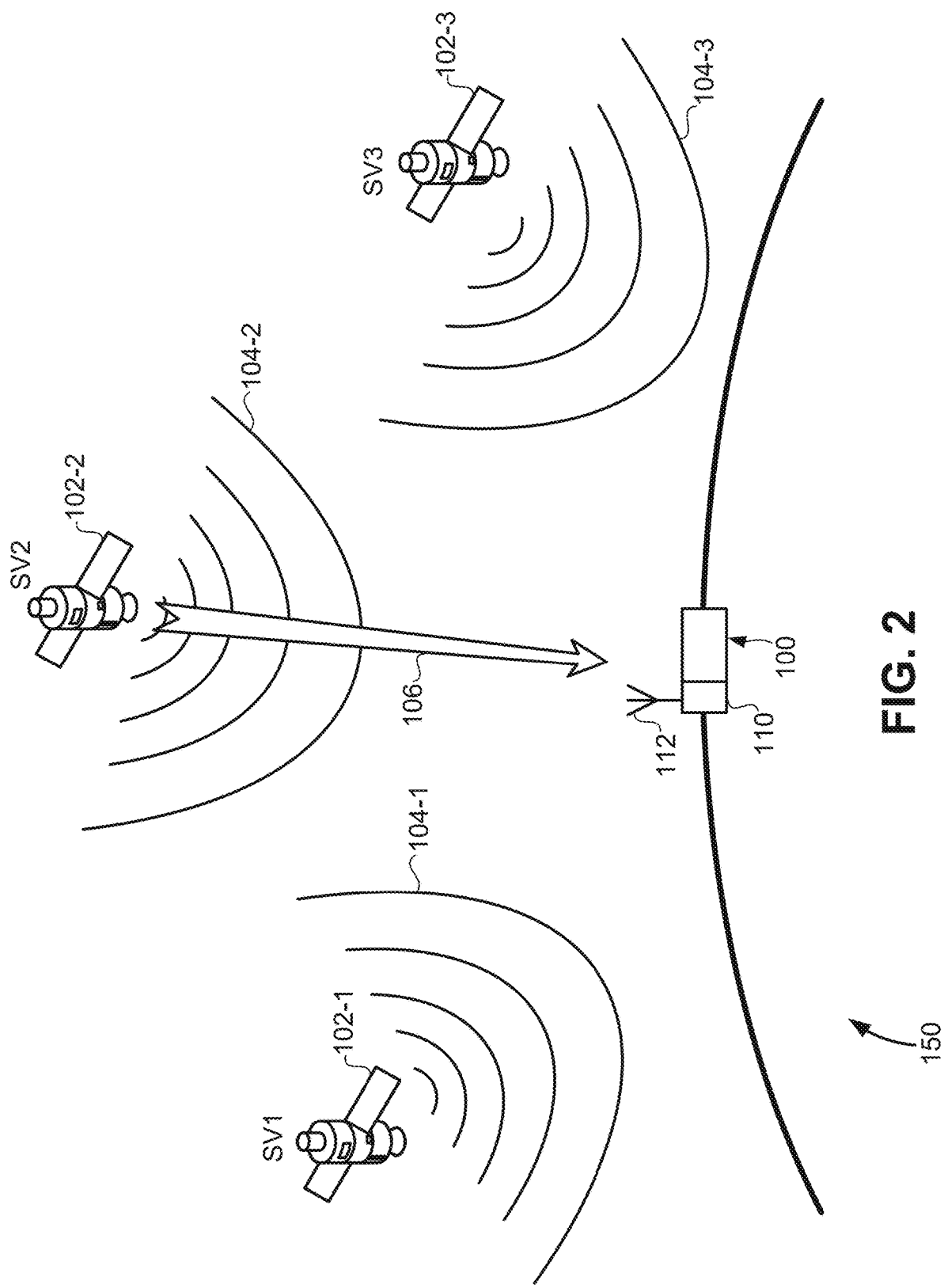
FIG. 2 illustrates an AR device implemented within a global navigation satellite system, according to an embodiment of the present disclosure.

FIG. 2 illustrates AR device 100 implemented within a GNSS 150, according to an embodiment of the present disclosure. GNSS 150 includes one or more GNSS satellites 102, i.e., space vehicles (SV), in orbit above AR device 100. GNSS satellites 102 continuously, periodically, or intermittently broadcast wireless signals 104 containing PRN codes modulated onto carrier frequencies (e.g., L1 and/or L2 carrier frequencies). Broadcasted wireless signals 104 include both direct wireless signals 106, i.e., signals transmitted and received without reflection off objects, and reflected wireless signals, i.e., signals received by GNSS receiver 110 after reflection off at least one object. Direct wireless signals 106 and reflected wireless signals are received by antenna 112 positioned within, on, or near GNSS receiver 110, and which may be a geodetic antenna, a rover antenna, or a handheld receiver antenna, among others. Wireless signals 104 corresponding to different GNSS satellites 102 may include different PRN codes that identify a particular GNSS satellite 102 such that GNSS receiver 110 may associate different distance estimates with different GNSS satellites 102. For example, GNSS satellite 102-1 broadcasts wireless signals 104-1 which contain a different PRN code than the PRN code contained in wireless signals 104-2 broadcasted by GNSS satellite 102-2. Similarly, GNSS satellite 102-3 broadcasts wireless signals 104-3 which contain a different PRN code than the PRN codes contained in wireless signals 104-1 and 104-2 broadcasted by GNSS satellites 102-1 and 102-2, respectively.

Merely by way of example, GNSS receiver 110 may use the three distance estimates between itself and GNSS satellites 102-1, 102-2, and 102-3 to generate a position estimate through a process called trilateration. Trilateration involves creating three spheres having center locations corresponding to the locations of the GNSS satellites 102 and radii corresponding to the distance estimates. The three spheres intersect at two locations, one of which is more plausible than the other given the position of the earth. The less plausible location is disregarded and the more plausible location is used as the position estimate for GNSS receiver 110. The position estimate may be continuously, periodically, or intermittently updated by generating new distance estimates from new wireless signals. Subsequent position estimates may benefit from previous position estimates through filtering processes (e.g., Kalman filtering) capable of improving position estimate accuracy. Position estimates may be determined using other techniques. In practice, a fourth satellite may be observed to estimate the receiver clock error with respect to the satellite system time.

Figure 3:
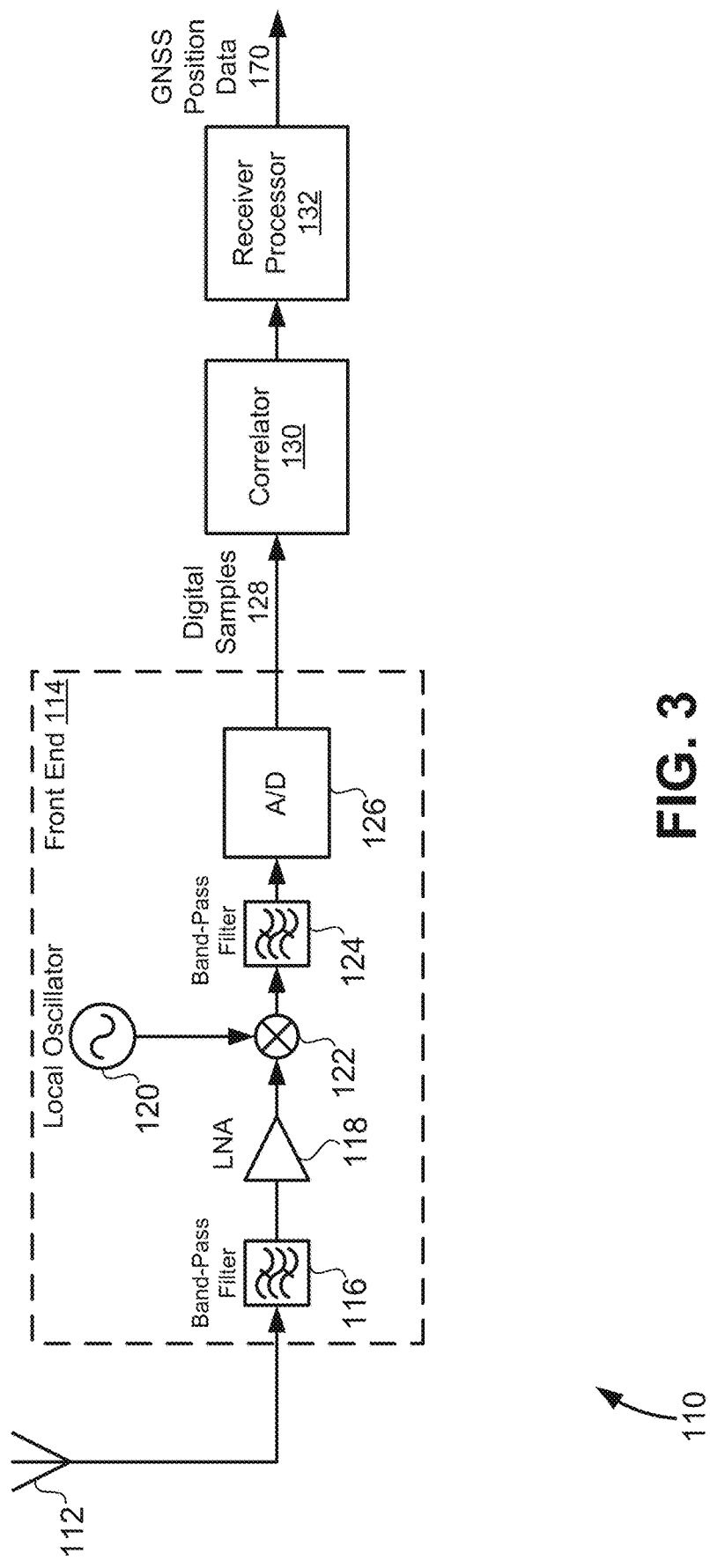
FIG. 3 illustrates a block diagram of a GNSS receiver, according to an embodiment of the present disclosure.

FIG. 3 illustrates a block diagram of GNSS receiver 110, according to an embodiment of the present disclosure. GNSS receiver 110 includes antenna 112 for receiving wireless signals 104 and sending/routing a signal related to wireless signals 104 to an RF front end 114. Antenna 112 may be linearly or circularly polarized, may be mounted or embedded, may be a single antenna or an array antenna, may have a narrow or wide bandwidth, among other possibilities. RF front ends are well known in the art, and in some instances include a band-pass filter 116 for initially filtering out undesirable frequency components outside the frequencies of interest, a low-noise amplifier (LNA) 118 for amplifying the received signal, a local oscillator 120 and a mixer 122 for down converting the received signal from RF to intermediate frequencies (IF), a band-pass filter 124 for removing frequency components outside IF, and an analog-to-digital (A/D) converter 126 for sampling the received signal to generate digital samples 128.

In some instances, RF front end 114 includes additional or fewer components than those shown in FIG. 3. For example, RF front end 114 may include a second local oscillator (90 degrees out of phase with respect to the first), a second mixer, a second band-pass filter, and a second A/D converter for generating digital samples corresponding to the quadrature component of wireless signals 104. Digital samples corresponding to the in-phase component of wireless signals 104 and digital samples corresponding to the quadrature component of wireless signals 104 may both be sent to a correlator 130. In some embodiments, digital samples corresponding to both in-phase and quadrature components may be included in digital samples 128.

Other components within RF front end 114 may include a phase-locked loop (PLL) for synchronizing the phase of local oscillator 120 with the phase of the received signal, and a phase shifter for generating a second mixing signal using local oscillator 120 that is 90 degrees out of phase with local oscillator 120. In some embodiments, RF front end 114 does not include band-pass filter 116 and LNA 118. In some embodiments, A/D converter 126 is coupled directly to antenna 112 and samples the RF signal directly without down-conversion to IF. In some embodiments, RF front end 114 only includes band-pass filter 116 and A/D converter 126. Other possible configurations of RF front end 114 are possible.

Digital samples 128 generated by RF front end 114 are sent to a correlator 130 and/or a receiver processor 132. Correlator 130 performs one or more correlations on digital samples 128 using local codes. In some embodiments, one or more operations performed by correlator 130 may alternatively be performed by receiver processor 132. In some embodiments, correlator 130 is a specific piece of hardware, such as an application-specific integrated circuit (ASIC) or a field-programmable gate array (FPGA). In some embodiments, operations performed by correlator 130 are performed entirely in software using digital signal processing (DSP) techniques. Therefore, although correlator 130 and receiver processor 132 are depicted in FIG. 3 as two separate components, in some instances, they may be considered as a single component (and may be referred to collectively as receiver processor 132).

Based on multiple distance estimates corresponding to multiple GNSS satellites 102, GNSS receiver 110 (i.e., receiver processor 132) generates and outputs GNSS position data 170 comprising a plurality of GNSS points. Each of the plurality of GNSS points may be a 3D coordinate represented by three real numbers. In some embodiments, the three real numbers may correspond to latitude, longitude, and elevation. In other embodiments, the three real numbers may correspond to X, Y, and Z positions.

Figure 4:
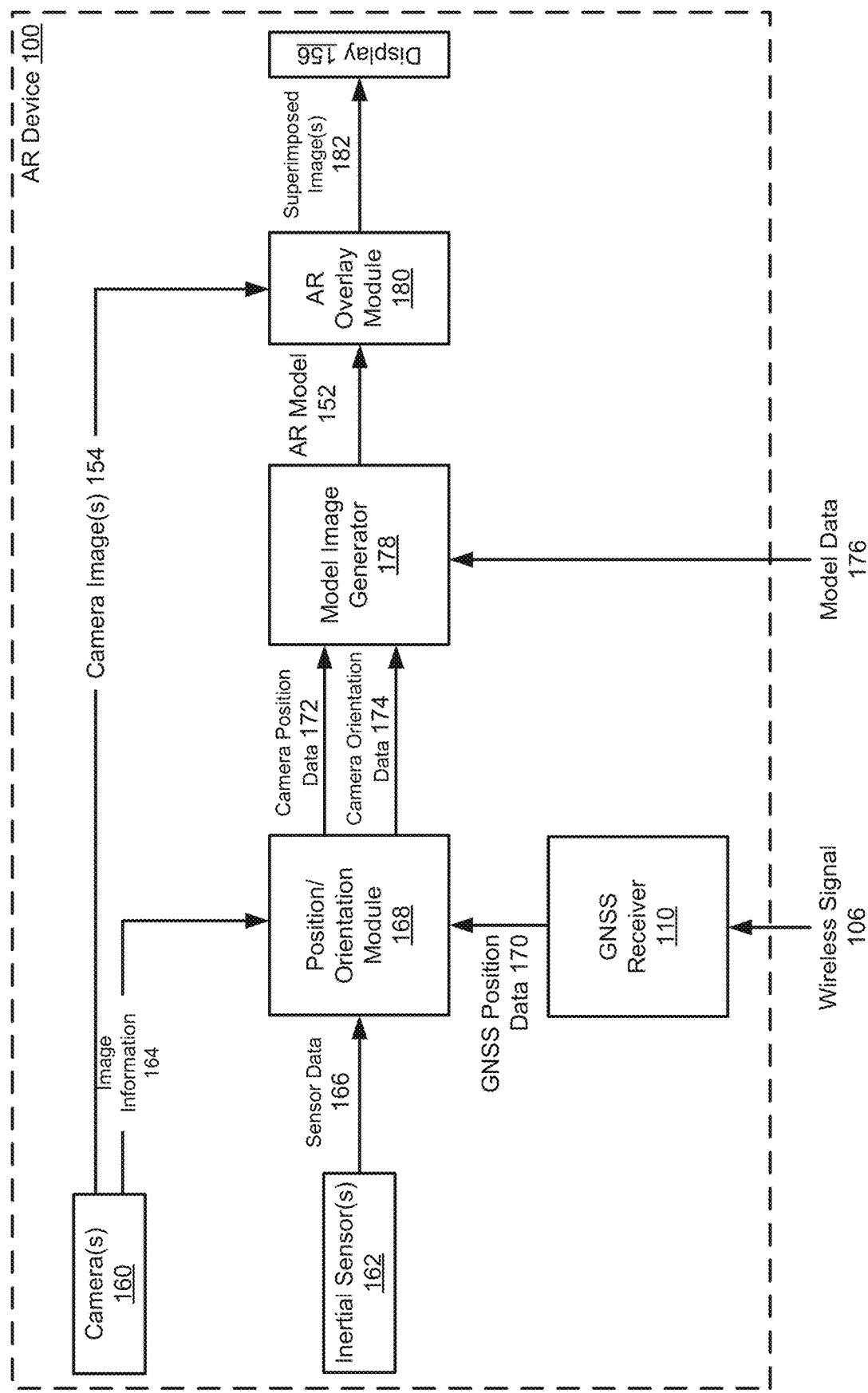
FIG. 4 illustrates a block diagram of an AR device, according to an embodiment of the present disclosure.

FIG. 4 illustrates a block diagram of AR device 100, according to an embodiment of the present disclosure. In some embodiments, AR device 100 includes one or more cameras 160 for generating image information 164 and for generating a single or multiple camera images 154. In some embodiments, the same camera used to generate image information 164 may be used to generate camera images 154. In some embodiments, a wide-angle lens (e.g., fisheye lens) may be utilized for generating image information 164 and a separate camera may be utilized for generating camera images 154. In some embodiments, image information 164 may be generated using multiple cameras configured to generate 3D maps of the surroundings. Furthermore, cameras 160 may include infrared (IR) projectors and IR sensors or any other technology that allows depth information of the surroundings to be obtained.

In some embodiments, AR device 100 includes one or more inertial sensors 162 for generating sensor data 166 (e.g., accelerometer and gyroscope data) which is used to determine orientation of AR device 100. In some instances, a single MEMS sensor may act as a six axis inertial sensor to detect various types of acceleration and rotation, including yaw, pitch, and roll, among other possibilities.

In some embodiments, AR device 100 includes a position/orientation module 168 for determining camera position data 172 and camera orientation data 174. Camera position data 172 may include a 3D coordinate (e.g., three real numbers) representing the relative position of camera 160 at a particular time. Similarly, camera orientation data 174 may include a 3D vector (e.g., three real numbers) representing the orientation of camera 160 at a particular time. Position/orientation module 168 may be configured to output positions and orientations periodically, at non-regular intervals, or upon receiving updated data from one or more of image information 164, sensor data 166, and GNSS position data 170. Position/orientation module 168 may be implemented in hardware and/or software, among other possibilities.

In some embodiments, position/orientation module 168 routes GNSS position data 170 through as camera position data 172 immediately or soon after receiving new GNSS position data 170. In some instances, performance of AR device 100 is improved when image information 164 and GNSS position data 170 are conjunctively used to determine camera position data 172. In some instances, this is accomplished by maintaining two separate and independent frames: an AR reference frame (corresponding to image information 164) and a geospatial reference frame (corresponding to GNSS position data 170). The AR reference frame represents a camera space which maintains the relationship between different AR points (3D positions determined based on image information 164). For example, a first AR point at a first time may be (0, 0, 0) within the AR reference frame, a second AR point at a second time may be (22.3, −12.6, 0) within the AR reference frame, and a third AR point at a third time may be (34.0, −22.9, −0.1) within the AR reference frame. Any operations performed on the AR reference frame, such as shifting or rotating, causes all points within the AR reference frame to be similarly affected. For example, shifting the AR reference frame by (0, 5, 0) would cause the three AR points to become (0, 5, 0), (22.3, −7.6, 0), and (34.0, −17.9, −0.1), respectively.

Similar to the AR reference frame, the geospatial reference frame represents a GNSS space which maintains the relationship between different GNSS points (3D positions determined based on GNSS position data 170). For example, a first GNSS point at a first time may be (10, 10, 10) within the geospatial reference frame, a second GNSS point at a second time may be (32.3, −2.6, 10) within the geospatial reference frame, and a third GNSS point at a third time may be (44.0, −12.9, 9.9) within the geospatial reference frame. Any operations performed on the geospatial reference frame, such as shifting or rotating, causes all points within the geospatial reference frame to be similarly affected. For example, shifting the geospatial reference frame by (0, 5, 0) would cause the three GNSS points to become (10, 15, 10), (32.3, 2.4, 10), and (44.0, −7.9, 9.9), respectively.

In an ideal scenario, AR points and GNSS points would be located at the same physical location. However, due to the differences between the two technologies, this is generally not the case. For example, GNSS position data 170 is generally received less frequently than image information 164, is generally more accurate and stable than image information 164 (e.g., centimeter accuracy), and does not suffer from initialization issues that are problematic with determining positions and tracking orientation using image information 164, e.g., the establishment of a new temporary local reference frame with the first AR point is generally set to (0, 0, 0). Furthermore, because of the initialization issues associated with using image information 164 (and also due to its inferior accuracy and drift over time and distance when using image information), the AR reference frame and the geospatial reference frame do not necessarily correspond to each other and therefore must be reconciled. To resolve these issues, among others, position/orientation module 168 may perform a series of steps in order to determine camera position data 172 and camera orientation data 174 that incorporate both image information 164 and GNSS position data 170. Some of these steps are illustrated in FIG. 5 by method 500 and are further detailed in reference to FIGS. 6A-6G.

In some embodiments, AR device 100 includes a model image generator 178 for generating a AR model 152. In some instances, model image generator 178 receives model data 176 via a wired or wireless connection which defines a model (e.g., a building, a structure, a tree, underground utilities, etc.). Model data 176 may include 3D coordinates corresponding to the model as well as other information for generating AR model 152, such as colors, textures, lighting, etc. In some embodiments, model image generator 178 generates AR model 152 based on each of camera position data 172, camera orientation data 174, and model data 176. For example, as the camera position and/or orientation changes, AR model 152 must also be modified to accurately reflect the difference in position and/or orientation (e.g., as the position of the camera gets further away from the position of the model, AR model 152 must become smaller). In some embodiments, AR model 152 is held static until a change in one or more of camera position data 172, camera orientation data 174, and model data 176 is detected by model image generator 178.

In some embodiments, AR device 100 includes an AR overlay module 180 for generating a superimposed image 182 by superimposing AR model 152 onto camera image 154. AR overlay module 180 may crop AR model 152 such that only the model is represented in AR model 152. In some instances, superimposed image 182 is output to display 156 which displays superimposed image 182 for viewing by a user. In some instances, a user may select whether or not AR model 152 is visible on display 156 or whether any transparency is applied to AR model 152. AR model 152 may also be cropped based on the presence of any objects within camera image 154 that are determined to be closer to camera 160 than the model. For example, based on image information 164, it may be determined that a tree within camera image 154 is closer to camera 160 than a building within AR model 152. AR model image 152 may then be cropped such that the tree appears in front of the building.

Figure 5:
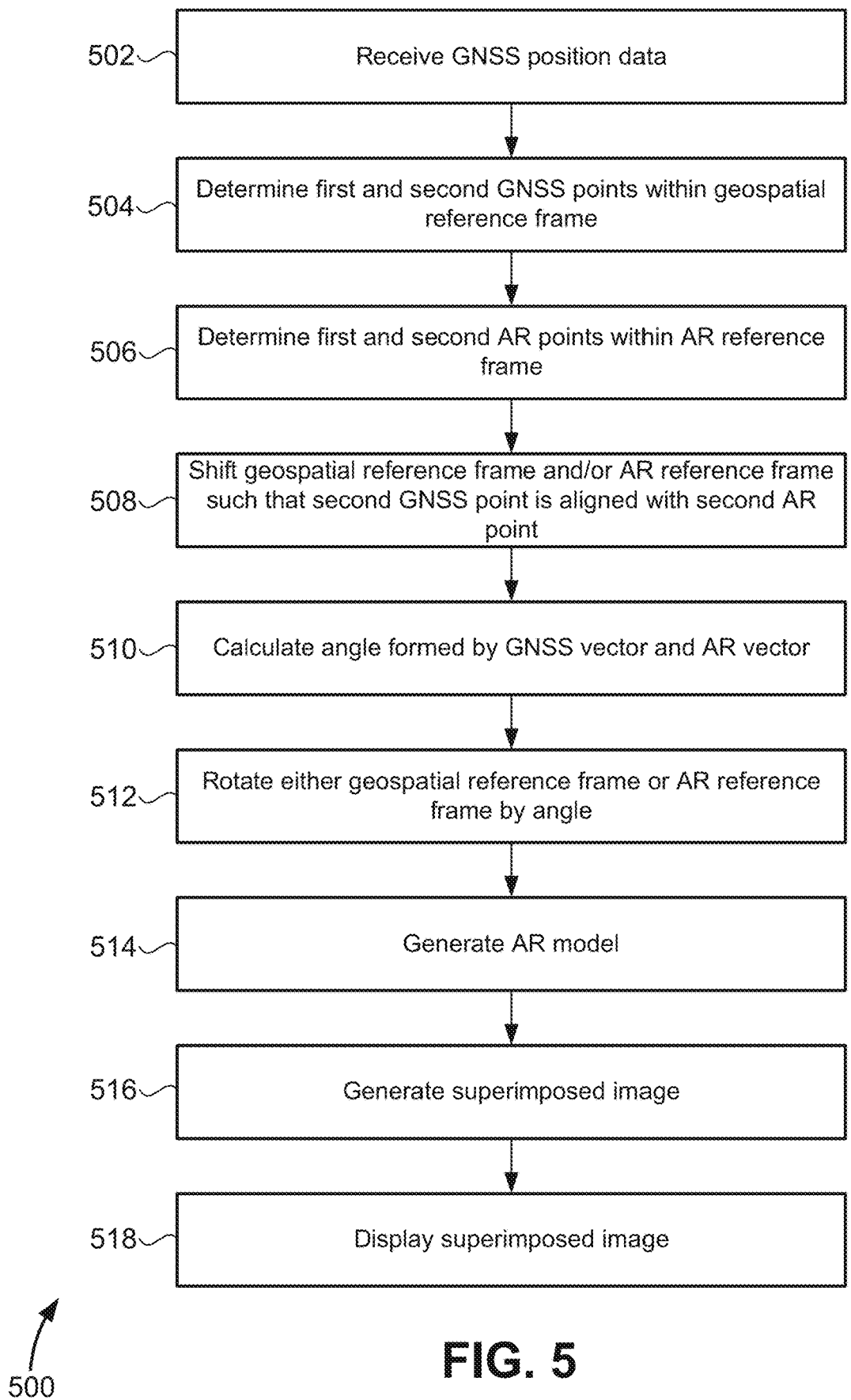
FIG. 5 illustrates a method for displaying images using an AR device, according to an embodiment of the present disclosure.

FIG. 5 illustrates a method 500 for displaying images using AR device 100, according to an embodiment of the present disclosure. Steps within method 500 may be performed in any order, and not all steps of method 500 need be performed. Method 500 may be performed continuously, periodically, or intermittently during operation of AR device 100, among other possibilities. At step 502, GNSS position data 170 is received by position/orientation module 168. In some embodiments, method 500 proceeds to step 504 after receiving any GNSS position data 170. In other embodiments, method 500 only proceeds to step 504 after receiving GNSS position data 170 having an accuracy level above a predetermined threshold. For example, because many GNSS receivers can determine an accuracy level along with each position estimate, these accuracy levels can be compared to the predetermined threshold prior to proceeding to step 504. In some embodiments, method 500 proceeds to step 504 after a certain amount of time despite not receiving GNSS position data 170 having an accuracy level above the predetermined threshold.

At step 504, position/orientation module 168 determines, based on GNSS position data 170, a first GNSS point within a geospatial reference frame at a first GNSS time within a first time range and a second GNSS point within the geospatial reference frame at a second GNSS time within a second time range. In some embodiments, the first GNSS point and the second GNSS point form a GNSS vector.

At step 506, position/orientation module 168 determines, based on image information 164, a first AR point within an AR reference frame at a first AR time within the first time range and a second AR point within the AR reference frame at a second AR time within the second time range. In some embodiments, the first AR point and the second AR point form an AR vector. In some embodiments, the first time range and the second time range correspond to lengths of time. In one particular example, the first time range may be 27.3 to 30.1 seconds, the first GNSS time may be 28.6 seconds, and the first AR time may be 27.8 seconds. Continuing with the same example, the second time range may be 45.8 to 46.1 seconds, the second GNSS time may be 45.8 seconds, and the second AR time may be 46.0 seconds. In various embodiments, the first time range may have a length of 10 milliseconds, 100 milliseconds, 1 second, 10 seconds, 1 minute, and the like. Similarly, in various embodiments, the second time range may have a length of 10 milliseconds, 100 milliseconds, 1 second, 10 seconds, 1 minute, and the like. In some embodiments, the first time range and the second time range may not temporally overlap, although in other embodiments they may overlap by a minimal amount (e.g., 5%, 10% overlap).

At step 508, position/orientation module 168 shifts the geospatial reference frame and/or the AR reference frame such that the second GNSS point is aligned with the second AR point.

At step 510, position/orientation module 168 calculates the angle formed by the GNSS vector and the AR vector. In some embodiments, step 510 may be performed prior to step 508 as shifting one or both of the geospatial reference frame and the AR reference frame does not change the angle formed by the two vectors. In some embodiments, step 510 is performed concurrently with step 512.

At step 512, position/orientation module 168 rotates either the geospatial reference frame to the AR reference frame or the AR reference frame to the geospatial reference frame by the calculated angle, causing the GNSS vector to become aligned with the AR vector. In some embodiments, both the geospatial reference frame and the AR reference frame are rotated until the GNSS vector is aligned with the AR vector. For example, if the calculated angle is 45 degrees, the geospatial reference frame may be rotated by 45 degrees, the AR reference frame may be rotated by 45 degrees (in the opposite direction), or both reference frames may be rotated by amounts that sum to 45 degrees (e.g., 22.5 degrees each).

At step 514, model image generator 178 generates AR model 152 based on model data 176, the shift performed in step 508, the rotation performed in step 512, camera position data 172, and/or camera orientation data 174. In general, proper functioning of AR device 100 may be achieved where the model defined by model data 176 is shifted and rotated along with the geospatial reference frame but not with the AR reference frame. For example, in some embodiments where only the geospatial reference frame is shifted and rotated, the model is shifted and rotated along with the geospatial reference frame so that it is displayed properly within model image 152. In other embodiments where only the AR reference frame is shifted and rotated, the model may retain its original coordinates in the AR reference frame.

At step 516, AR overlay module 180 generates superimposed image 182 by superimposing AR model 152 onto camera image 154. At step 518, display 156 displays superimposed image 182.

Figure 6A:
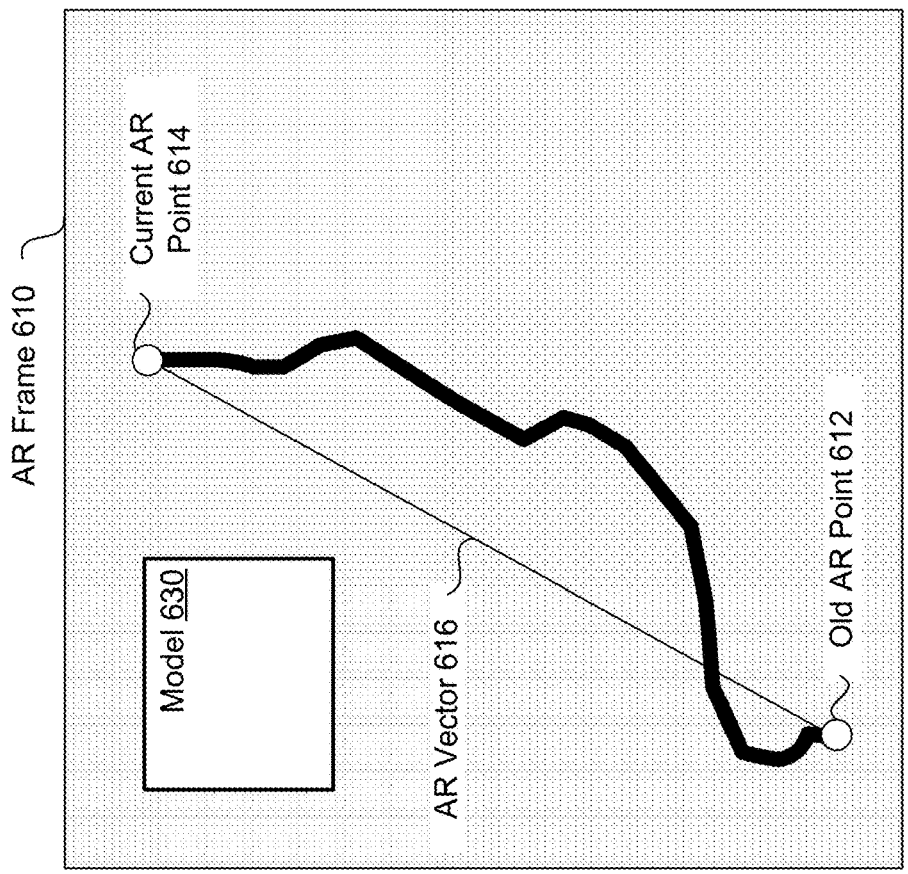
Figure 6A:
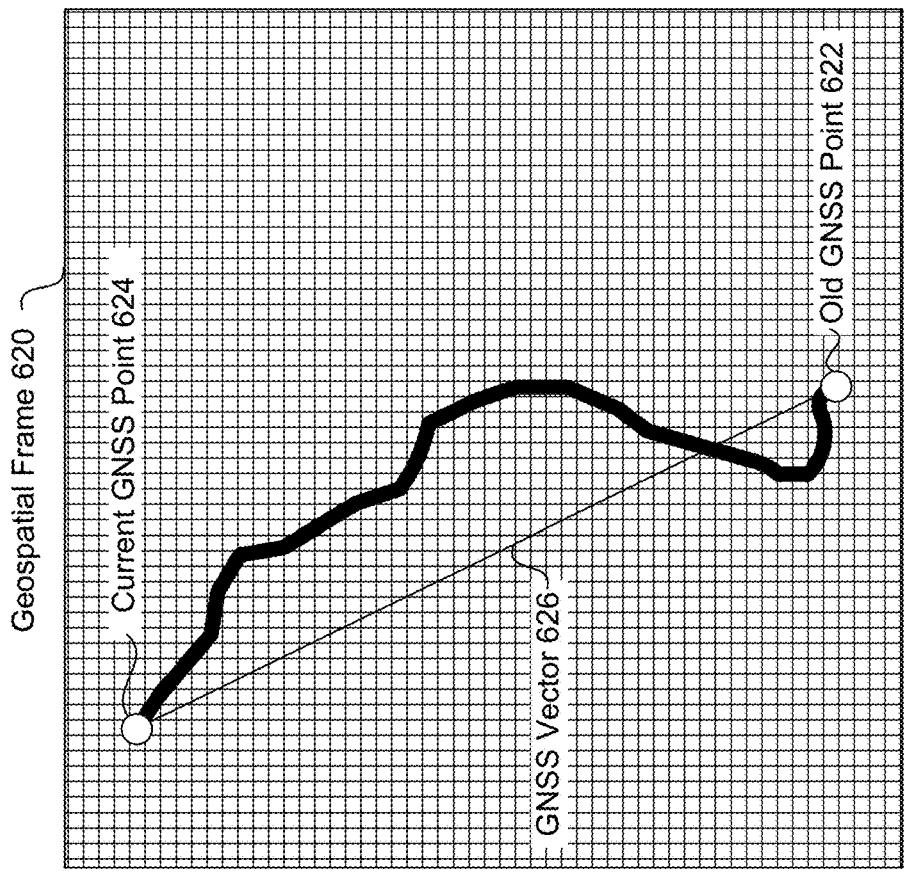

FIGS. 6A-6G illustrate methods for displaying an AR model on AR device 100, according to some embodiment of the present disclosure. Referring to FIG. 6A, old GNSS point 622 within geospatial reference frame 620 and old AR point 612 within AR reference frame 610 may be determined at a first time, and current GNSS point 624 within geospatial reference frame 620 and current AR point 614 within AR reference frame 610 may be determined at a second time. Between the first time and the second time, additional points may be determined for both reference frames (as shown by the thick solid lines). In some embodiments, the second time may be when an additional GNSS point becomes available after the first time. For example, although AR points may be determined on the milliseconds timescale, GNSS points may only be available every few seconds. GNSS points may be particularly delayed in situations where AR device 100 is being used with limited satellite visibility. For example, where AR device 100 is being used under a tree or in a building, GNSS points may only be available once every few minutes.

In some embodiments, an AR model 630 as defined by model data 176 may be configured within AR reference frame 610 as shown in FIG. 6A. For example, prior to performing any of steps 508, 510, and 512 of FIG. 5, AR model 630 may be included within AR reference frame 610 similar to old AR point 612 and current AR point 614 such that AR model 630 may be shifted and/or rotated along with AR reference frame 610. As described herein, AR model 630 may be a virtual representation of any number of structures, e.g., house, building, tree, underground utilities, etc.

Figure 6B:
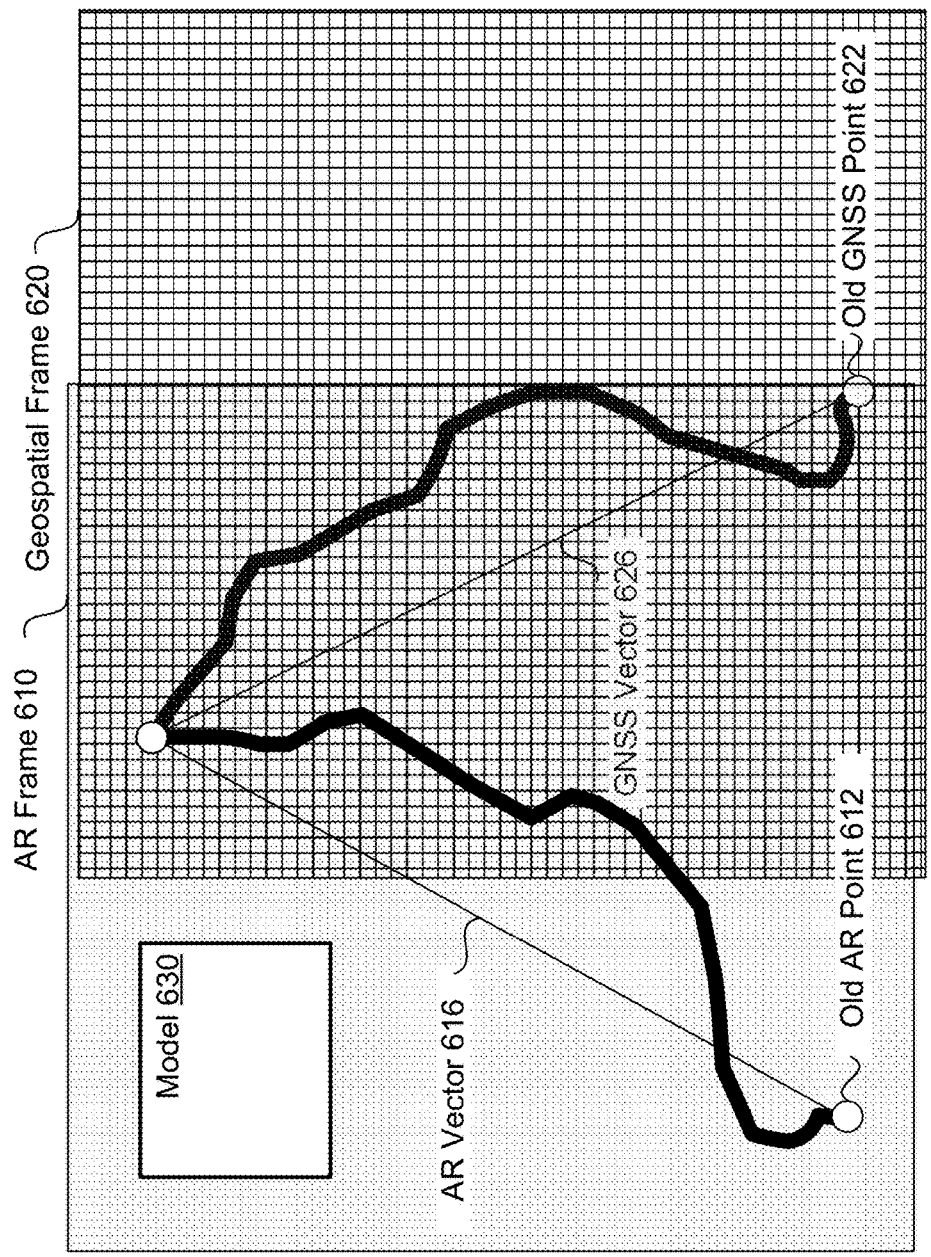

Referring to FIG. 6B, one or both of geospatial reference frame 620 and AR reference frame 610 may be shifted such that current GNSS point 624 is aligned with current AR point 614. Alignment may occur over several dimensions. For example, geospatial reference frame 610 may be shifted in each of three dimensions. Upon alignment of current GNSS point 624 with current AR point 614, GNSS vector 626 becomes aligned with AR vector 616 on at least one end of GNSS vector 626.

Figure 6C:
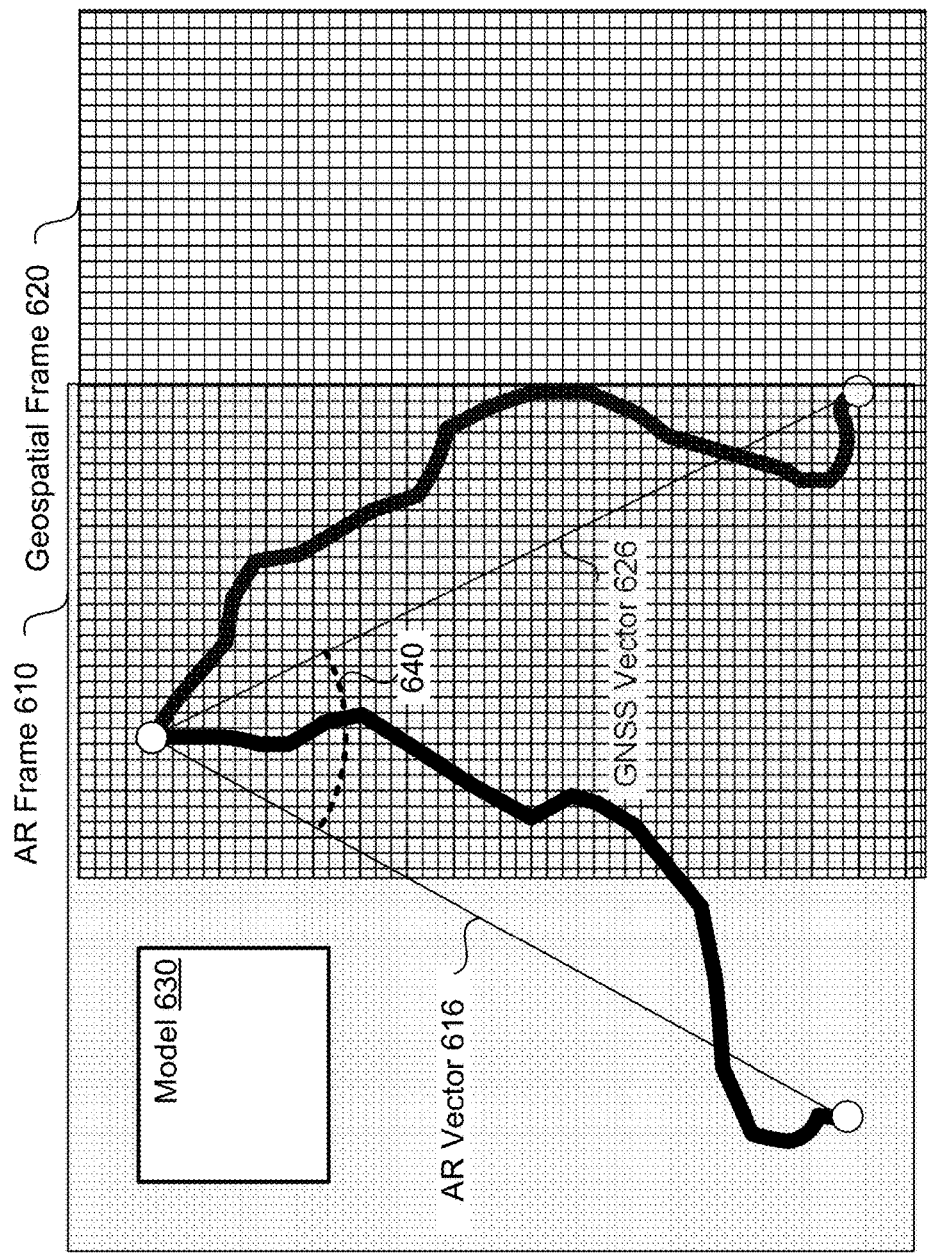
Figure 6D:
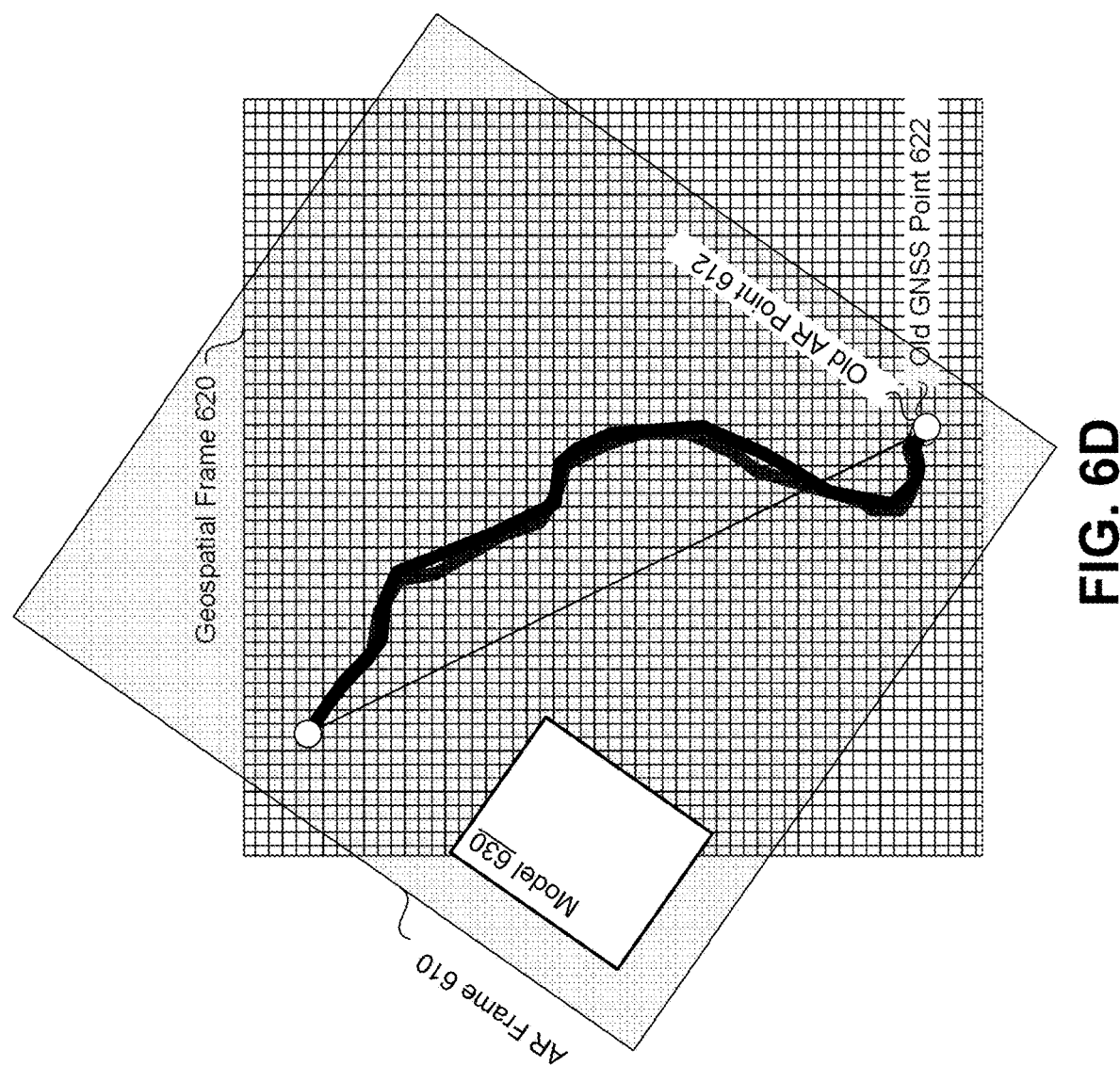

Referring to FIG. 6C, an angle 640 formed by GNSS vector 626 and AR vector 616 is calculated. Referring to FIG. 6D, either geospatial reference frame 620 is rotated to AR reference frame 610, or AR reference frame 610 is rotated to geospatial reference frame 620 by angle 640, causing GNSS vector 626 to become aligned with AR vector 616. In some embodiments, both geospatial reference frame 620 and AR reference frame 610 are rotated until GNSS vector 626 is aligned with AR vector 616. Rotation may occur over several dimensions. For example, geospatial reference frame 610 may be rotated in each of three dimensions.

Referring to FIG. 6E, GNSS point 628 within geospatial reference frame 620 and AR point 618 within AR reference frame 610 may be determined at a third time. Between the second time and the third time, additional points may be determined for both reference frames (as shown by the thick solid lines). In some embodiments, the third time may be when an additional GNSS point becomes available after the second time.

Assuming the shaded area associated with geospatial reference frame 620 and the shaded area associated with AR reference frame 610 represent planes in their respective reference planes, these planes are generally aligned following alignment of the GNSS vector 626 and the AR vector 616. These planes may be titled, however, along axis 650 passing through old GNSS point 622 and old AR point 612, and current GNSS point 624 and current AR point 614.

Figure 6F:
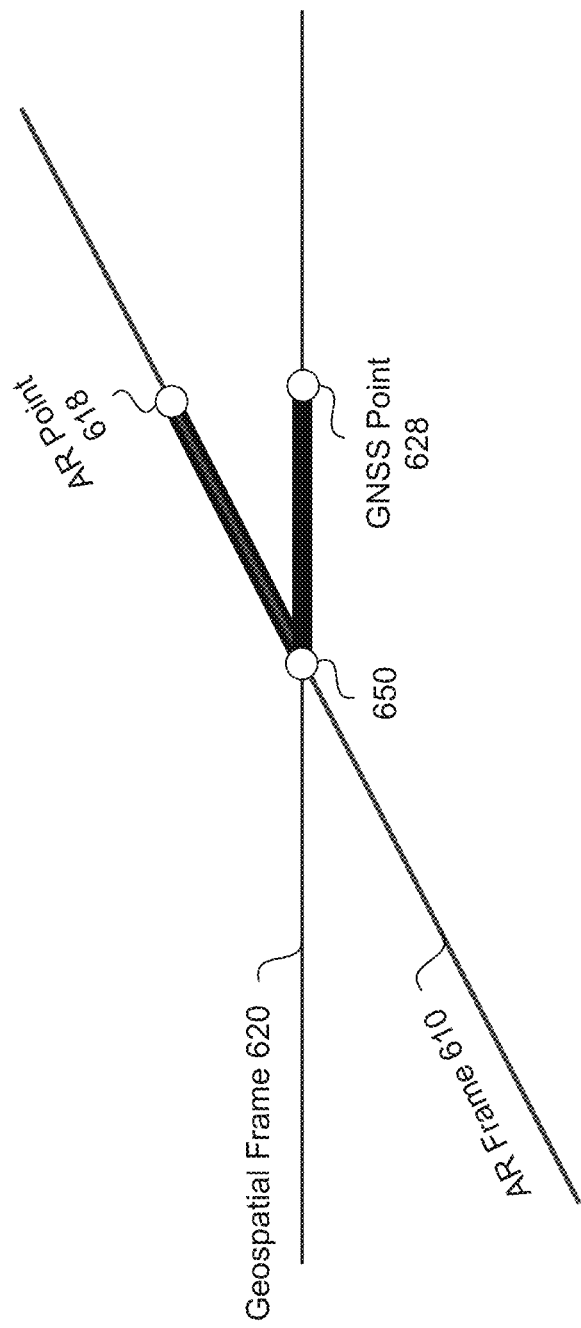

This is illustrated in FIG. 6F, where the perspective has been changed from looking at axis 650 in plan view to looking along axis 650. In FIG. 6F, axis 650 extends into and out of the page. From this perspective, it can be seen that the planes associated with geospatial reference frame 620 and AR reference frame 610 are tilted so that GNSS point 628 and AR point 618 are separated. Although not shown in FIG. 6E because of the perspective, AR point 618 is vertically above GNSS point 628.

Figure 6G:
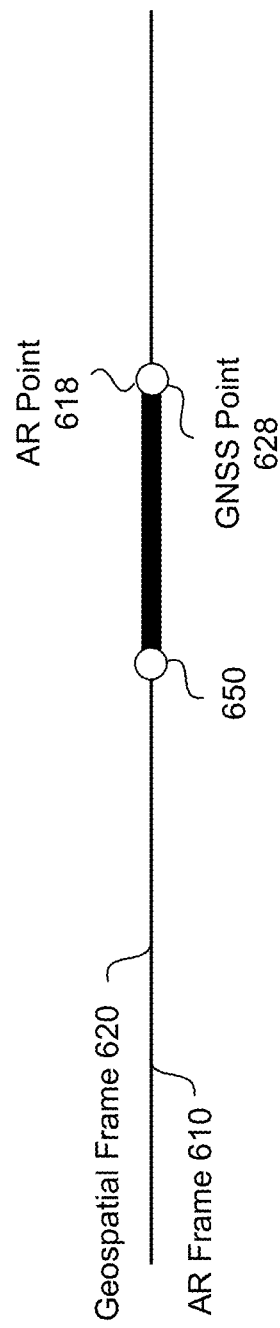

Referring to FIG. 6G, either geospatial reference frame 620 is rotated to AR reference frame 610, AR reference frame 610 is rotated to geospatial reference frame 620, or geospatial reference frame 620 and AR reference frame 610 are both rotated causing GNSS point 628 to become aligned with AR point 618 while maintaining alignment between GNSS vector 626 and AR vector 616.

Figure 7A:
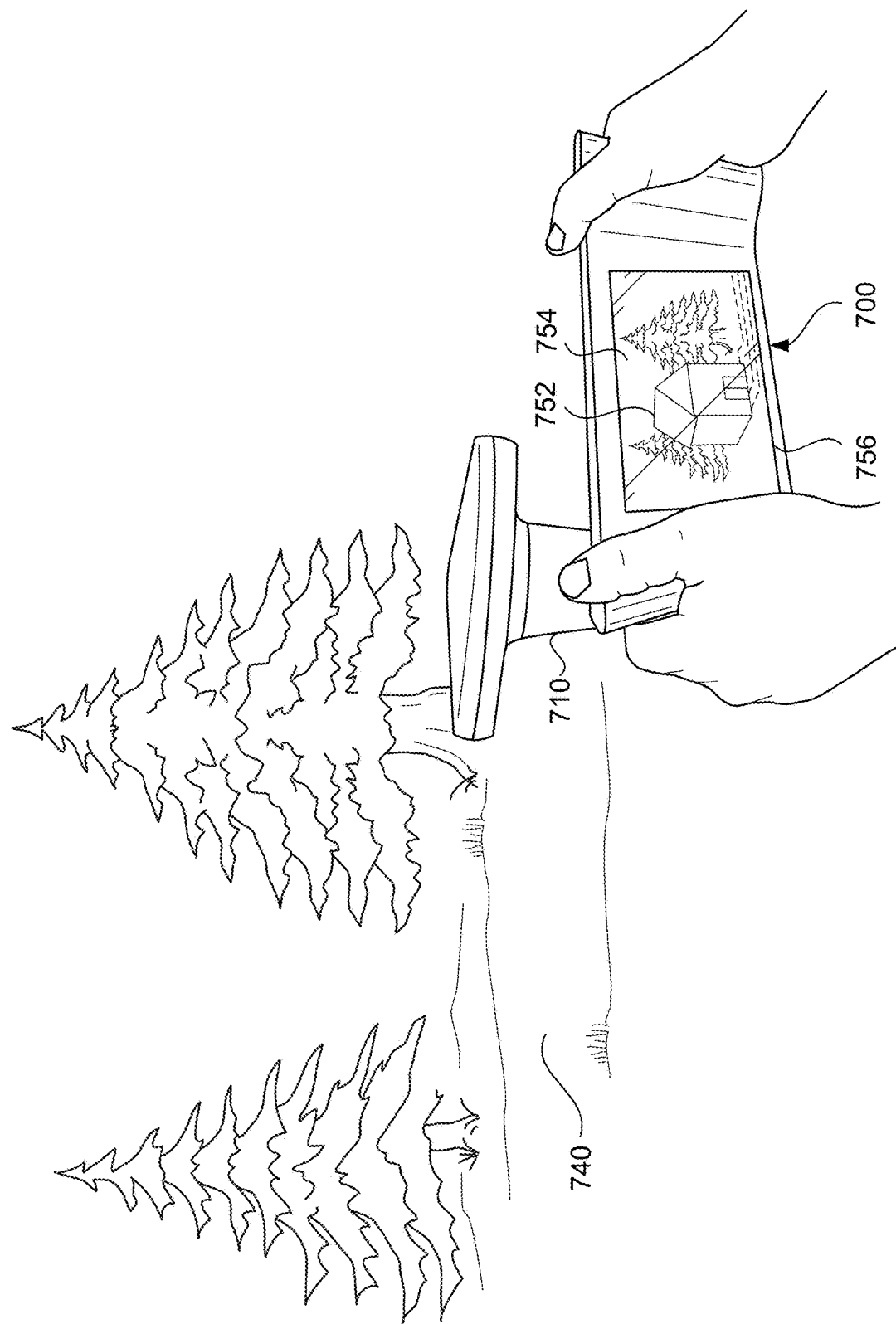
FIGS. 7A-7C illustrates a jump of an AR model displayed on an AR device, according to an embodiment of the present disclosure.
Figure 7B:
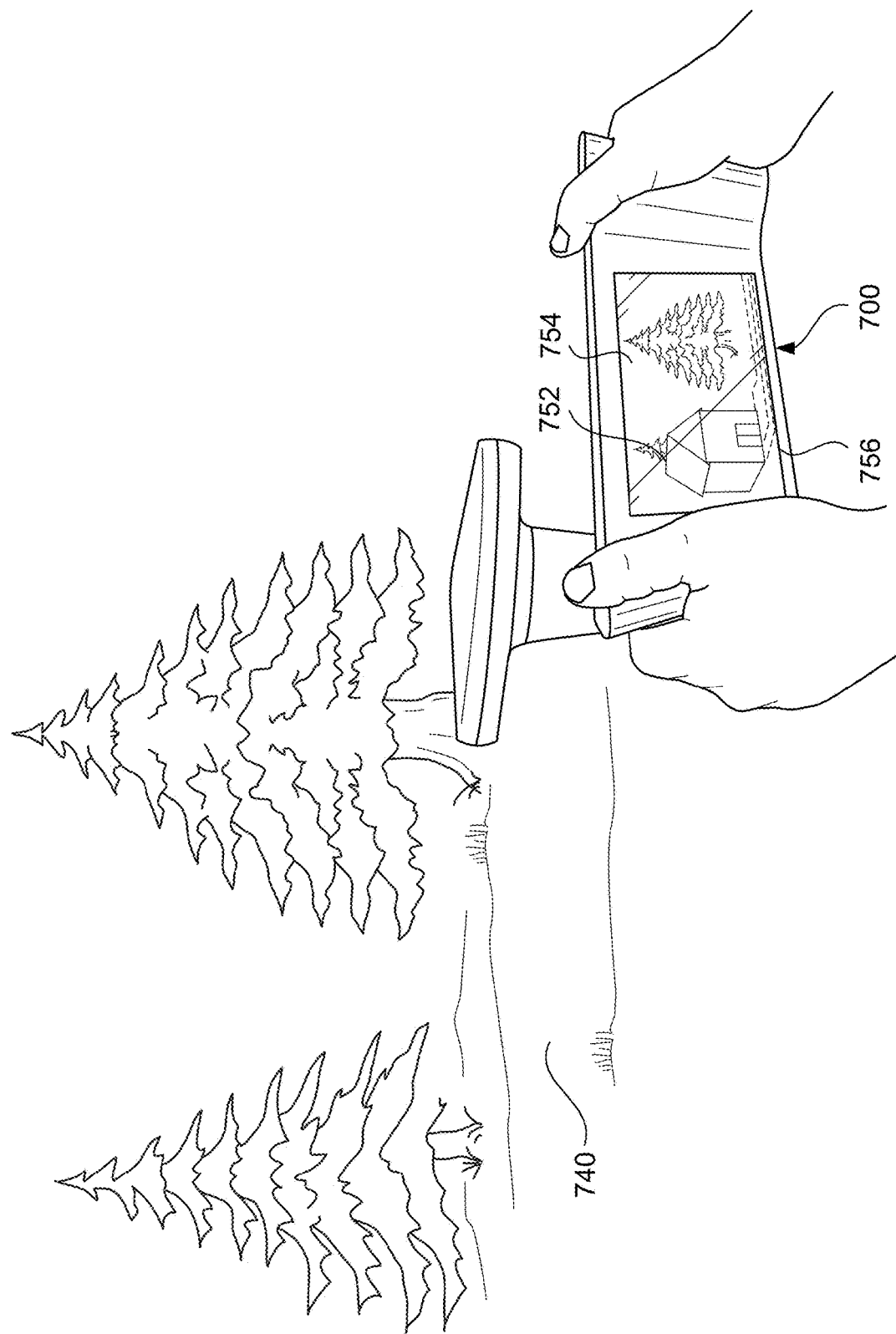
Figure 7C:
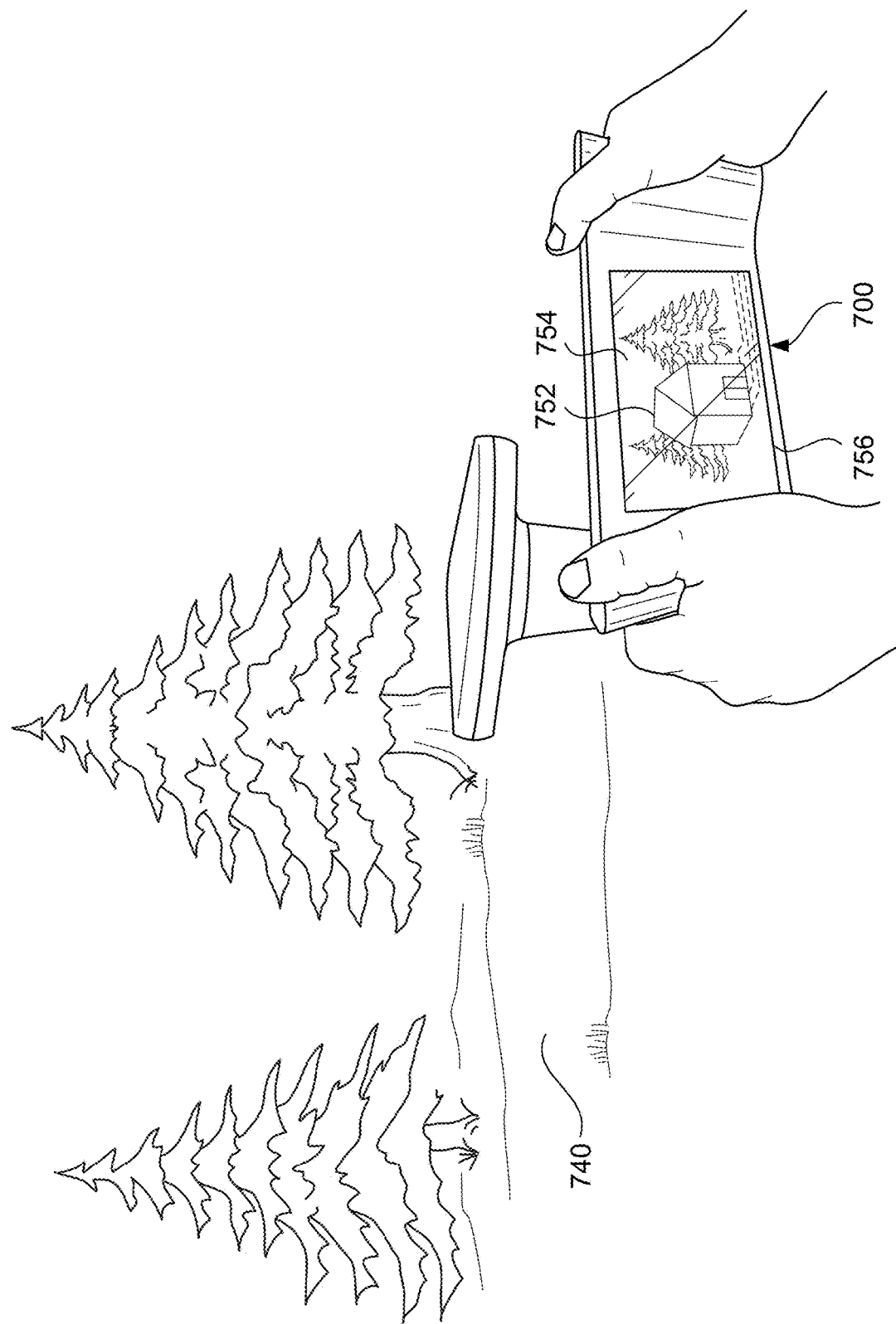

FIGS. 7A-7C illustrates jumps or sudden movements of an AR model displayed on an AR device, according to an embodiment of the present disclosure. FIG. 7A is similar to FIG. 1, and shows an AR device 700 in use at a potential construction site 740. AR device 700 includes a display 756 for displaying an AR model 752 that is superimposed onto a camera image 754 (collectively referred to as a superimposed image). Movement of the AR device 700, including position and orientation, may be tracked using image information from one or more cameras (not shown in FIG. 7), GNSS position data from GNSS receiver 710, and/or sensor data from one or more inertial sensors (not shown in FIG. 7). The image information is typically used with visual odometry techniques to track the movement of the AR device 700 and update positioning of the AR model 752 relative to the camera image 754.

Referring to FIG. 7A, the AR model 752 is superimposed onto the camera image 754 at a position between the two trees. In FIG. 7B, the AR model jumps to a position in front of the left tree. In FIG. 7C, the AR model 752 is moved back to the same position as that in FIG. 7A (between the two trees).

FIGS. 7A-7C may represent sequential camera frames or camera images each separated by one or more camera frames. Although the first jump illustrated in FIGS. 7A-7B may have a number of causes, in at least some instances, the jump may be the result of an error in the visual odometry process, where objects or features are mis-identified as objects or features from previous images. This leads to a current location of the AR device 700 being incorrectly determined, and the AR reference frame being adjusted based on the incorrect location. The location may be incorrect in position and/or orientation. Adjusting the AR reference frame causes the AR model 752 to jump relative to the geospatial reference frame. The second jump illustrated in FIGS. 7B-7C is the result of a correction that is applied to adjust the AR reference frame back to the location of FIG. 7A (the location or near to the location prior to the jump).

Changes in position and/or orientation of the AR model 752 may be monitored from frame to frame and compared to expected changes based on position and sensor information (e.g., GNSS position data from GNSS receiver 710, sensor data from one or more inertial sensors, and the like). When a jump of the AR model 752 is detected that is not consistent with an expected change based on the sensor information, a negative jump can be introduced to adjust the AR model 752 back to the previous location. In some embodiments, the jump must be greater than a predetermined threshold before a negative jump is introduced. As an example, a threshold may be a change in position of about 10 cm or greater or an orientation change of about 1° or greater in some embodiments.

Changes in location greater than the threshold may be considered a jump. In response, the AR reference frame may be shifted or rotated relative to the geospatial reference frame by an amount approximately equal in magnitude but opposite in direction to the jump. This helps ensures that coordinates in the AR model 752 more closely align with corresponding coordinates in the geospatial reference frame.

Figure 8:
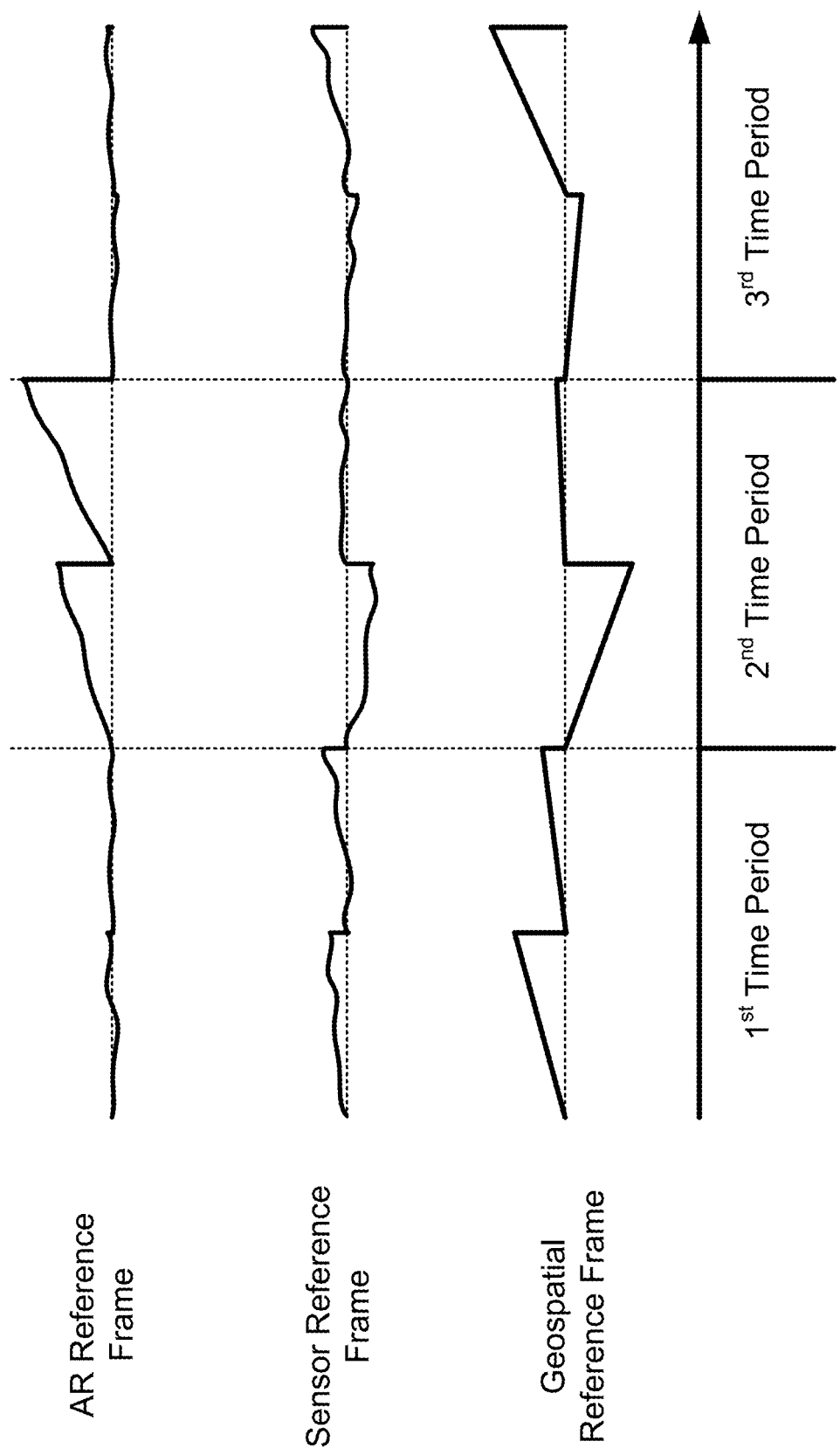
FIG. 8 illustrates a method of tracking and controlling a position and orientation of an AR device, according to an embodiment of the present disclosure.

FIG. 8 illustrates a method of tracking and controlling a position and orientation of an AR device, according to an embodiment of the present disclosure. This method can improve positioning of the AR model during periods when visual tracking is difficult or not available. This can occur, for example, when there are not enough features or there is not enough contrast between features in images for tracking, in low light conditions, in busy environments with lots of moving objects, and others.

FIG. 8 illustrates three time periods and three reference frames. The time periods include a $1^{st}$ Time Period, a $2^{nd}$ Time Period, and a $3^{rd}$ Time Period, and the reference frames include an AR Reference Frame, a Sensor Reference Frame, and a Geospatial Reference Frame. During the $1^{st}$ Time Period and the $3^{rd}$ Time Period, visual tracking is functioning properly, whereas during the $2^{nd}$ Time Period, visual tracking is difficult or not available.

The AR Reference Frame is primarily aligned with actual coordinates using image information, which may be augmented with sensor data and GNSS position data. The image information can be provided by one or more cameras. The Sensor Reference Frame is primarily aligned with the actual coordinates using sensor data, which may be augmented with image information and GNSS position data. The sensor data may be provided by one or more inertial sensors. The Geospatial Reference Frame is primarily aligned with the actual coordinates using GNSS position data. In this example, the Geospatial Reference Frame is not augmented with image information or sensor data. The GNSS position data can be provided by a GNSS receiver.

Starting with the Geospatial Reference Frame, this figure is intended to show how the Geospatial Reference Frame aligns with actual coordinates. The Geospatial Reference Frame may be aligned using, for example, GNSS position data. The horizontal dotted line in the figure represents the actual coordinates, and the dark lines are intended to show alignment of the Geospatial Reference Frame with the actual coordinates. As illustrated in this example, alignment is good when GNSS position data is received (in this case at the beginning, middle, and end of each time period), but because the GNSS position data is periodic, the alignment degrades with time from the last GNSS position data. Note that the alignment is consistent during each of the time periods since GNSS position data is not impacted by the loss of visual tracking during the $2^{nd}$ Time Period.

Turning next to the AR Reference Frame, this figure is intended to show that alignment is good during the $1^{st}$ Time Period and the $3^{rd}$ Time Period when visual tracking is functioning properly, but alignment degrades rapidly during the $2^{nd}$ Time Period when visual tracking is difficult or not available. The AR Reference Frame may be aligned using, for example, visual odometry techniques. Alignment is augmented with GNSS position data in this example, as can be seen by the resets in the alignment each time GNSS position data is received.

Turning last to the Sensor Reference Frame, this figure is intended to show that alignment is overall better than the GNSS reference frame because the sensor data provides more frequent updates. The alignment is worse than the AR Reference Frame during the $1^{st}$ Time Period and the $3^{rd}$ Time Period, but better than the AR Reference Frame during the $2^{nd}$ Time Period. The sensor data is not impacted by the loss of visual tracking during the $2^{nd}$ Time Period. Alignment is augmented with GNSS position data in this example, as can be seen by the resets in the alignment each time GNSS position data is received.

As the example of FIG. 8 illustrates, GNSS position data and sensors data can be used to provide motion tracking when visual tracking is lost. Thus, in accordance with some embodiments, an AR model can be aligned with an AR reference frame during periods of time when visual tracking is functioning properly, and the AR model can be aligned with a sensor reference frame during periods of time when visual tracking is difficult or not available. This can improve overall positioning of the AR model.

Figure 9:
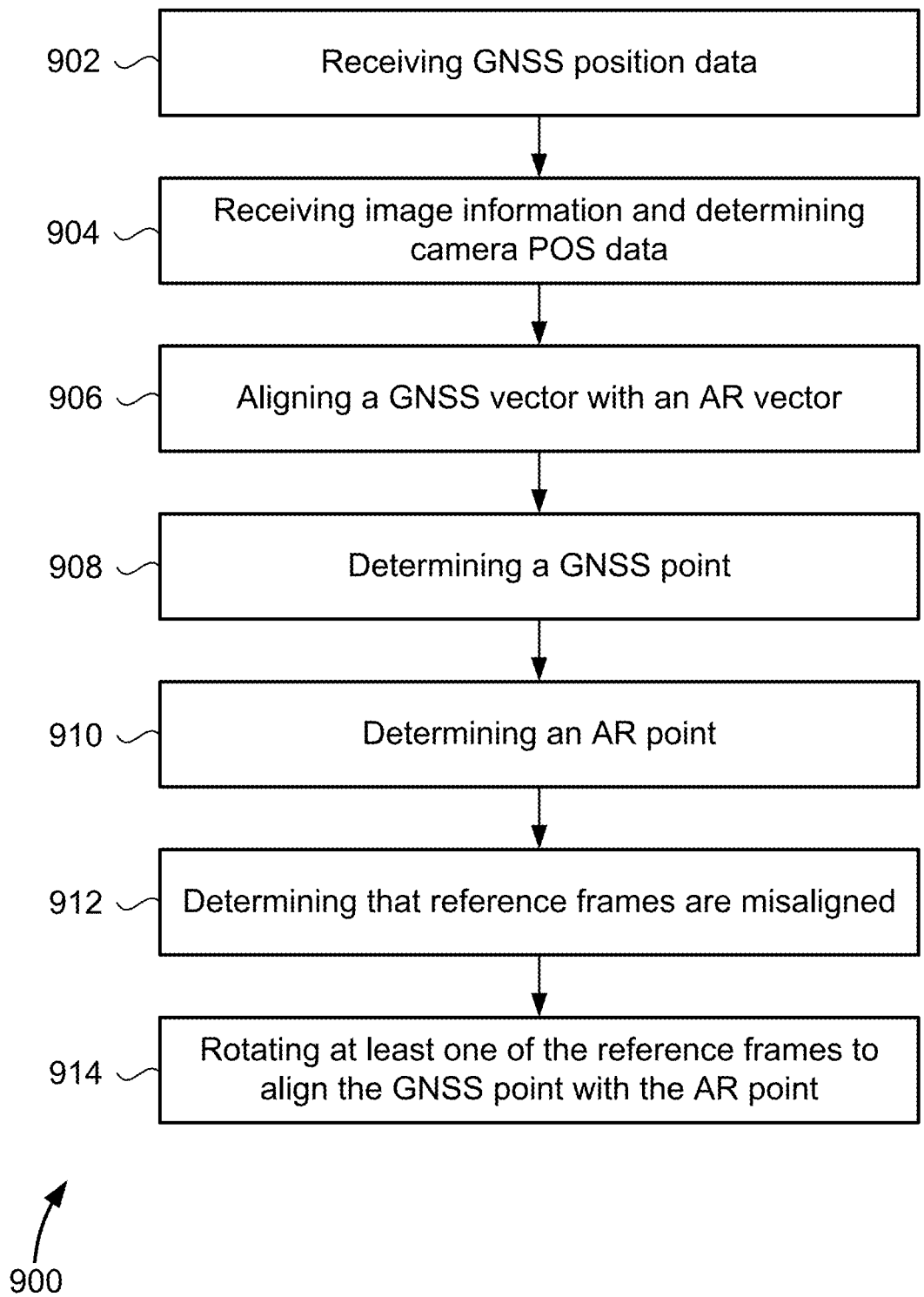
FIGS. 9-11 illustrate methods for displaying an AR model on an AR device, according to some embodiments of the present disclosure.

FIG. 9 illustrates a method for displaying an AR model on an AR device, according to an embodiment of the present disclosure. The method includes receiving GNSS position data (902). The GNSS position data may be received from a GNSS receiver and may be based on wireless signals received from GNSS satellites. The GNSS receiver may be integrated with the AR device.

The method also includes receiving image information and determining camera POS data (904). The image information may be received from one or more cameras, and the camera POS data may be determined from the image information. The one or more cameras may be integrated with the AR device.

The method also includes aligning a GNSS vector with an AR vector (906). The GNSS vector may be associated with a geospatial reference frame and may be determined using the GNSS position data. The AR vector may be associated with an AR reference frame and may be determined using the camera POS data. Aligning the GNSS vector with the AR vector may include (i) determining, based on the GNSS position data, a first GNSS point within the geospatial reference frame at a first GNSS time within a first time range and a second GNSS point within the geospatial reference frame at a second GNSS time within a second time range, the first GNSS point and the second GNSS point forming the GNSS vector, (ii) determining, based on the camera POS data, a first AR point within the AR reference frame at a first AR time within the first time range and a second AR point within the AR reference frame at a second AR time within the second time range, the first AR point and the second AR point forming the AR vector, (iii) shifting at least one of the geospatial reference frame or the AR reference frame such that the second GNSS point is aligned with the second AR point, thereafter (iv) calculating an angle formed by the GNSS vector and the AR vector, and (v) rotating at least one of the geospatial reference frame or the AR reference frame to the other of the geospatial reference frame or the AR reference frame based on the angle.

The method also includes determining a GNSS point (908). The GNSS point may be a point within the geospatial reference frame and may be determined based on the GNSS position data.

The method also includes determining an AR point (910). The AR point may be a point within the AR reference frame and may be determined based on the camera POS data.

The method also includes determining that the reference frames are misaligned (912). The misalignment may be determined based on the GNSS point and the AR point. Determining that the reference frames are misaligned may include determining that the geospatial reference frame and the AR reference frame are misaligned by more than a predetermined amount. The predetermined amount may be about 10 cm or greater in some embodiments. Determining that the reference frames are misaligned may include determining that the geospatial reference frame and the AR reference frame are misaligned vertically.

The method also includes rotating at least one of the reference frames to align the GNSS point with the AR point (914). Alignment between the GNSS vector and the AR vector may be maintained during rotation so that coordinates in the AR model approximately align with corresponding coordinates in the geospatial reference frame. Approximate alignment may be within about 0.5° in some embodiments. The rotation of the reference frames may be about a horizontal axis. In some embodiments, the AR reference frame is rotated to align with the geospatial reference frame such that the GNSS point is aligned with the AR point.

Figure 10:
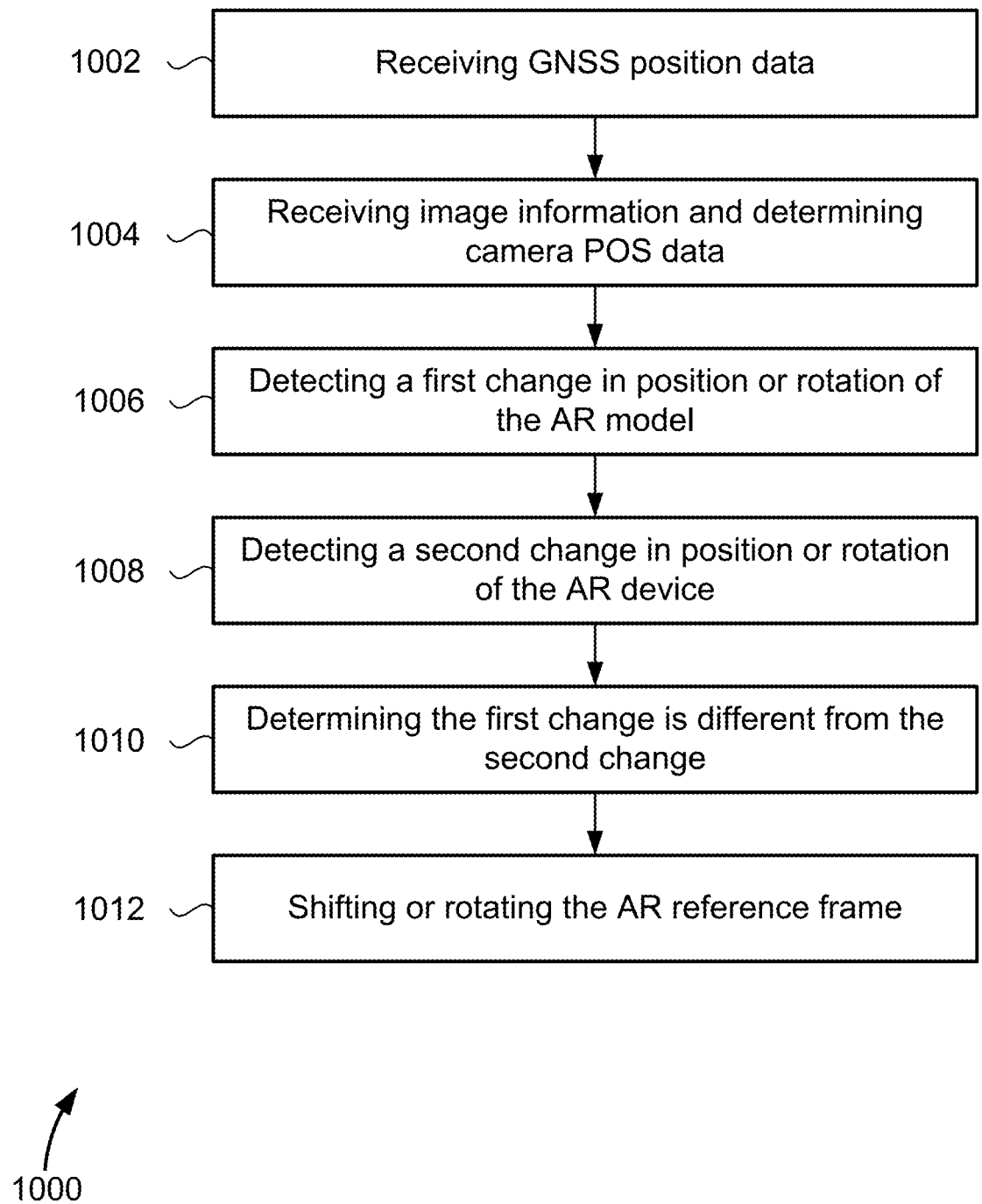

FIG. 10 illustrates a method for displaying an AR model on an AR device, according to another embodiment of the present disclosure. The method includes receiving GNSS position data (1002). The GNSS position data may be associated with a geospatial reference frame and may be received from a GNSS receiver.

The method also includes receiving image information and determining camera POS data (1004). The image information may be received from one or more cameras, and the camera POS data may be determined from the image information.

The method also includes detecting a first change in position or rotation of the AR model (1006), detecting a second change in position or rotation of the AR device (1008), and determining the first change is different from the second change (1010). The first change may occur between a first frame of the one or more cameras and a second frame of the one or more cameras. The first change may be a change in position or rotation that is more than the second change by greater than a predetermined amount. The second change may be determined using inertial sensors configured to determine movement of the AR device relative to the AR reference frame.

The method also includes shifting or rotating the AR reference frame (1012). The AR reference frame may be shifted or rotated by an amount approximately equal in magnitude but opposite in direction to the first change so that coordinates in the AR model approximately align with corresponding coordinates in the geospatial reference frame. Shifting or rotating the AR reference frame relative to the geospatial reference frame may shift or rotate the AR model relative to the geospatial reference frame.

Figure 11:
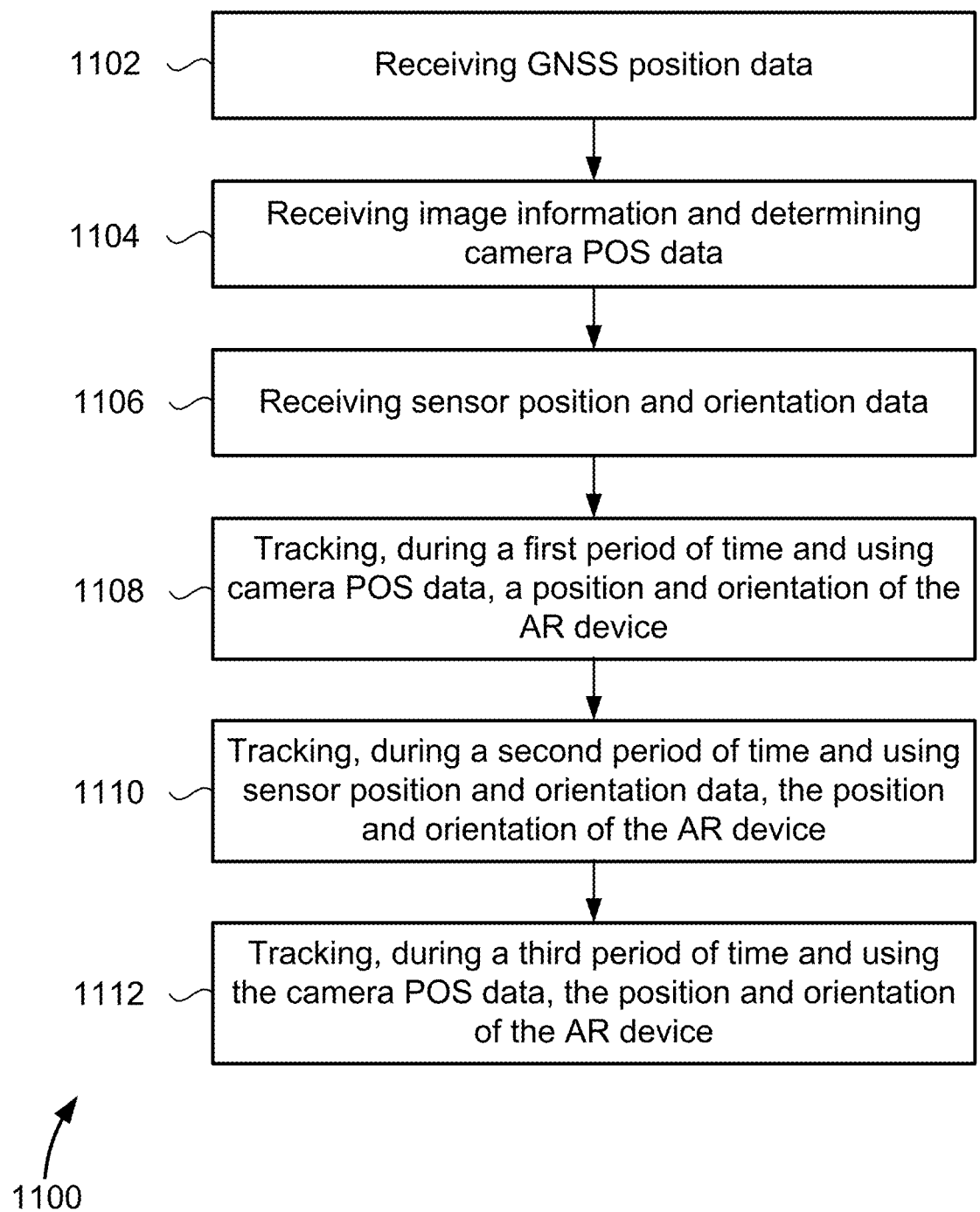

FIG. 11 illustrates a method for displaying an AR model on an AR device, according to another embodiment of the present disclosure. The method includes receiving GNSS position data (1102), and receiving image information and determining camera POS data (1104).

The method also includes receiving sensor position and orientation data (1106). The sensor position and orientation data may be associated with a sensor reference frame and may be received from one or more inertial sensors. The sensor position and orientation data may be provided by the GNSS receiver and one or more inertial sensors coupled to the AR device.

The method also includes tracking, during a first period of time and using camera POS data, a position and orientation of the AR device (1108). The AR model may arranged within the AR reference frame during the first period of time.

The method also includes tracking, during a second period of time and using sensor position and orientation data, the position and orientation of the AR device (1110). The AR model may arranged within the sensor reference frame during the second period of time. During the second period of time, the geospatial reference frame may be more closely aligned with the sensor reference frame than the AR reference frame.

The method also includes tracking, during a third period of time and using the camera POS data, the position and orientation of the AR device (1112). The AR model may be arranged within the AR reference frame during the third period of time. The position and orientation of the AR device may be tracked during the first period of time and the third period of time using visual odometry.

It should be appreciated that the specific steps illustrated in FIGS. 9-11 provide particular methods for displaying an AR model on an AR device according to some embodiments. Other sequences of steps may also be performed according to alternative embodiments. For example, alternative embodiments may perform the steps outlined above in a different order. Moreover, the individual steps illustrated in FIGS. 9-11 may include multiple sub-steps that may be performed in various sequences. Furthermore, additional steps may be added or removed depending on the particular application.

Figure 12:
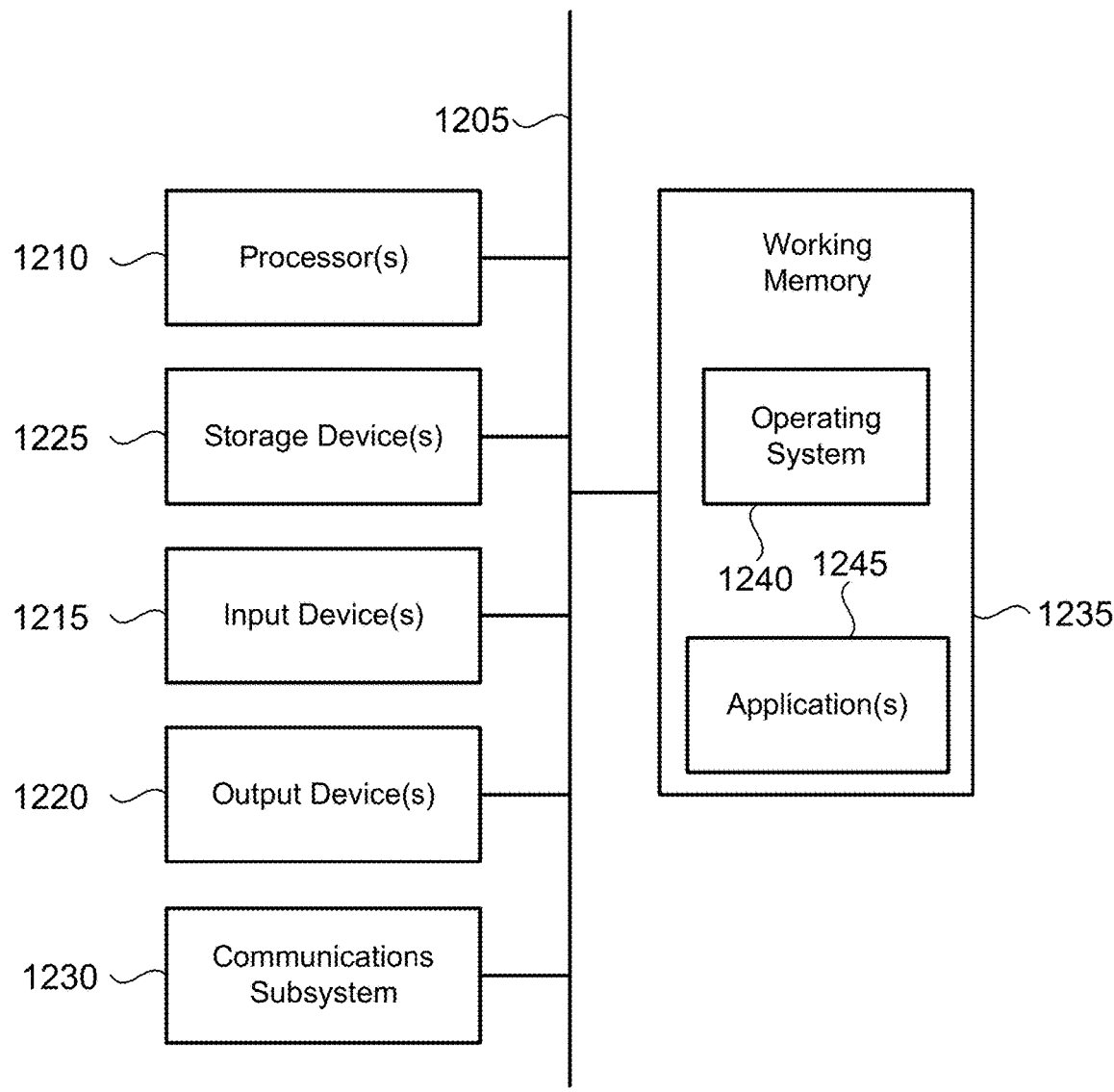
FIG. 12 illustrates a simplified computer system, according to an embodiment of the present disclosure.

FIG. 12 illustrates a simplified computer system (or AR device) according to an embodiment of the present disclosure. A computer system 1200 as illustrated in FIG. 12 may be incorporated into devices such as a portable electronic device, mobile phone, or other device as described herein. FIG. 12 provides a schematic illustration of one embodiment of a computer system 1200 that can perform some or all of the steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or more integrated manner.

The computer system 1200 is shown comprising hardware elements that can be electrically coupled via a bus 1205, or may otherwise be in communication, as appropriate. The hardware elements may include one or more processors 1210, including without limitation one or more general-purpose processors and/or one or more special-purpose processors such as digital signal processing chips, graphics acceleration processors, and/or the like; one or more input devices 1215, which can include, without limitation a mouse, a keyboard, a camera, and/or the like; and one or more output devices 1220, which can include, without limitation a display device, a printer, and/or the like.

The computer system 1200 may further include and/or be in communication with one or more non-transitory storage devices 1225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1200 might also include a communications subsystem 1230, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1230 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1230. In other embodiments, a portable electronic device, e.g. the first electronic device, may be incorporated into the computer system 1200, e.g., an electronic device as an input device 1215. In some embodiments, the computer system 1200 will further comprise a working memory 1235, which can include a RAM or ROM device, as described above.

The computer system 1200 also can include software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1225 described above. In some cases, the storage medium might be incorporated within a computer system, such as computer system 1200. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as the computer system 1200 to perform methods in accordance with various embodiments of the technology. According to a set of embodiments, some or all of the procedures of such methods are performed by the computer system 1200 in response to processor 1210 executing one or more sequences of one or more instructions, which might be incorporated into the operating system 1240 and/or other code, such as an application program 1245, contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1230 and/or components thereof generally will receive signals, and the bus 1205 then might carry the signals and/or the data, instructions, etc. carried by the signals to the working memory 1235, from which the processor(s) 1210 retrieves and executes the instructions. The instructions received by the working memory 1235 may optionally be stored on a non-transitory storage device 1225 either before or after execution by the processor(s) 1210.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for displaying an augmented reality (AR) model on an AR device, the method comprising:
   receiving, from a global navigation satellite system (GNSS) receiver, GNSS position data based on wireless signals received from GNSS satellites;
   receiving, from one or more cameras, image information;
   determining, from the image information, camera position and orientation (POS) data;
   aligning a GNSS vector in a geospatial reference frame with an AR vector in an AR reference frame, the GNSS vector determined using the GNSS position data, and the AR vector determined using the camera POS data;
   determining, based on the GNSS position data, a GNSS point within the geospatial reference frame separate from GNSS points of the GNSS vector and not aligned with the GNSS vector;
   determining, based on the camera POS data, an AR point within the AR reference frame separate from AR points of the AR vector and not aligned with the AR vector;
   determining, based on the GNSS point and the AR point, that the geospatial reference frame and the AR reference frame are misaligned; and
   rotating at least one of the geospatial reference frame or the AR reference frame such that the GNSS point is aligned with the AR point, while maintaining alignment between the GNSS vector and the AR vector, so that coordinates in the AR model approximately align with corresponding coordinates in the geospatial reference frame.

2. The method of claim 1 wherein the rotation of at least one of the geospatial reference frame or the AR reference frame is about a horizontal axis.

3. The method of claim 1 wherein determining that the geospatial reference frame and the AR reference frame are misaligned includes determining that the geospatial reference frame and the AR reference frame are misaligned by more than a predetermined amount.

4. The method of claim 1 wherein determining that the geospatial reference frame and the AR reference frame are misaligned includes determining that the geospatial reference frame and the AR reference frame are misaligned vertically.

5. The method of claim 1 wherein the GNSS receiver is integrated with the AR device.

6. The method of claim 1 wherein the one or more cameras are integrated with the AR device.

7. The method of claim 1 wherein aligning the GNSS vector in the geospatial reference frame with the AR vector in the AR reference frame comprises:
   determining, based on the GNSS position data, a first GNSS point within the geospatial reference frame at a first GNSS time within a first time range and a second GNSS point within the geospatial reference frame at a second GNSS time within a second time range, the first GNSS point and the second GNSS point forming the GNSS vector;
   determining, based on the camera POS data, a first AR point within the AR reference frame at a first AR time within the first time range and a second AR point within the AR reference frame at the second AR time within the second time range, the first AR point and the second AR point forming the AR vector;
   shifting at least one of the geospatial reference frame or the AR reference frame such that the second GNSS point is aligned with the second AR point; thereafter
   calculating an angle formed by the GNSS vector and the AR vector; and
   rotating at least one of the geospatial reference frame or the AR reference frame to the other of the geospatial reference frame or the AR reference frame based on the angle.

8. The method of claim 1 wherein the AR reference frame is rotated to align with the geospatial reference frame such that the GNSS point is aligned with the AR point.

9. A method for displaying an augmented reality (AR) model on an AR device, the method comprising:
   receiving, from a global navigation satellite system (GNSS) receiver, GNSS position data associated with a geospatial reference frame, the GNSS position data based on wireless signals received from GNSS satellites;
   receiving, from one or more cameras, image information;
   determining, from the image information, camera position and orientation (POS) data associated with an AR reference frame;
   detecting a first change in position or rotation of the AR model relative to the geospatial reference frame using the POS data;
   detecting a second change in position or rotation of the AR device relative to the AR reference frame using inertial sensor data;
   determining that the first change is different from the second change in at least one of shift or rotation; and
   performing at least one of shifting the AR reference frame or rotating the AR reference frame relative to the geospatial reference frame by an amount approximately equal in magnitude but opposite in direction to the first change, so that coordinates in the AR model approximately align with corresponding coordinates in the geospatial reference frame.

10. The method of claim 9 wherein the first change occurs between a first frame of the one or more cameras and a second frame of the one or more cameras.

11. The method of claim 9 wherein the first change is a change in position or rotation that is more than the second change by greater than a predetermined amount.

12. The method of claim 9 wherein shifting or rotating the AR reference frame relative to the geospatial reference frame shifts or rotates the AR model relative to the geospatial reference frame.

13. The method of claim 9 wherein the second change is determined using the inertial sensor data generated by inertial sensors configured to determine movement of the AR device relative to the AR reference frame.

14. A method for displaying an augmented reality (AR) model on an AR device, the method comprising:
receiving, from a global navigation satellite system (GNSS) receiver, GNSS position data associated with a geospatial reference frame, the GNSS position data based on wireless signals received from GNSS satellites;
receiving, from one or more cameras, image information;
determining, from the image information, camera position and orientation (POS) data associated with an AR reference frame;
receiving, from the GNSS receiver and one or more inertial sensors, sensor position and orientation data associated with a sensor reference frame;
tracking, during a first period of time and using the camera POS data, a position and orientation of the AR device, wherein the AR model is aligned based on the AR reference frame during the first period of time; thereafter
tracking, during a second period of time immediately following the first period of time and using the sensor position and orientation data, the position and orientation of the AR device, wherein the AR model is aligned based on the sensor reference frame during the second period of time; and thereafter
tracking, during a third period of time immediately following the second period of time and using the camera POS data, the position and orientation of the AR device, wherein the AR model is aligned based on the AR reference frame during the third period of time.

15. The method of claim 14 wherein the position and orientation of the AR device is tracked during the first period of time and the third period of time using visual odometry.

16. The method of claim 14 wherein the sensor position and orientation data is provided by the GNSS receiver and one or more inertial sensors coupled to the AR device.

17. The method of claim 14 wherein insufficient image contrast exists to track the position and orientation of the AR device during the second period of time.

18. The method of claim 14 wherein during the second period of time, the geospatial reference frame is more closely aligned with the sensor reference frame than the AR reference frame.

19. The method of claim 14 wherein the GNSS receiver is integrated with the AR device.

20. The method of claim 14 wherein the one or more cameras are integrated with the AR device.

* * * * *